(12) United States Patent
Okumura

(10) Patent No.: US 11,182,128 B2
(45) Date of Patent: Nov. 23, 2021

(54) MULTIPLY-ACCUMULATE OPERATION DEVICE, MULTIPLY-ACCUMULATE OPERATION METHODS, AND SYSTEMS

(71) Applicant: RENESAS ELECTRONICS CORPORATION, Tokyo (JP)

(72) Inventor: Shunsuke Okumura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 160 days.

(21) Appl. No.: 16/545,570

(22) Filed: Aug. 20, 2019

(65) Prior Publication Data

US 2020/0081687 A1 Mar. 12, 2020

(30) Foreign Application Priority Data

Sep. 7, 2018 (JP) .............................. JP2018-167802

(51) Int. Cl.
*G06F 7/544* (2006.01)
(52) U.S. Cl.
CPC .................................. *G06F 7/5443* (2013.01)
(58) Field of Classification Search
CPC .................................................... G06F 7/5443
See application file for complete search history.

(56) References Cited

U.S. PATENT DOCUMENTS

| 10,210,419 | B2 | 2/2019 | Nomura et al. | |
| 10,340,003 | B1 * | 7/2019 | Chang | G11C 13/0026 |
| 2018/0046906 | A1 * | 2/2018 | Dally | G06F 7/5443 |
| 2019/0102190 | A1 * | 4/2019 | Madduri | G06F 9/3001 |

FOREIGN PATENT DOCUMENTS

JP 2017-079017 A 4/2017

OTHER PUBLICATIONS

J. Zhang et al., "In-Memory Computation of a Machine-Learning Classifier in a Standard 6T SRAM Array", IEEE Journal of Solid-State Circuits, vol. 52, No. 4, Apr. 2017, pp. 915-924.
Angizi Shaahin et al.; "IMCE: Energy-efficient bit-wise in-memory convolution engine for deep neural network", 2018 23rd Asis and South Pacific Design Automation Conference (ASP-DAC), IEEE, Jan. 22, 2018, pp. 111-116.
Extended European Search Report issued in corresponding European Patent Application No. 19190658.5-1218, dated Jan. 31, 2020.
European Office Action issued in corresponding European Patent Application No. 19190658.5-1218, dated Feb. 10, 2021.

* cited by examiner

*Primary Examiner* — Michael D. Yaary
(74) *Attorney, Agent, or Firm* — McDermott Will & Emery LLP

(57) ABSTRACT

A multiply-accumulate calculation device, a multiply-accumulate calculation method, and a system for efficiently performing a multiply-accumulate calculation are provided. The multiply-accumulate operation device includes a plurality of memory blocks that store a plurality of multiplied elements and performs a multiply-accumulate operation on input data. Each of memory blocks includes stores one bit value of the same bit digit of a plurality of multiplied elements. An input data generation unit generates input data by extracting data of a same bit digit from the plurality of multiplication elements. A control unit that accumulates and adds value of the multiply-accumulate operation result, and a data memory that stores the accumulated addition value as a multiplication element of the next multiply-accumulate operation.

12 Claims, 19 Drawing Sheets

FIG. 6

| STEP | BIT DIGIT OF MULTIPLICATION ELEMENT $a^k_i$ | BLOCK ADDRESS |
|---|---|---|
| 1 | k=0 | 3 |
| 2 | k=0 | 4 |
| 3 | k=0 | 5 |
| 4 | k=0 | 6 |
| 5 | k=1 | 3 |
| 6 | k=1 | 4 |
| 7 | k=1 | 5 |
| 8 | k=1 | 6 |
| 9 | k=2 | 3 |
| 10 | k=2 | 4 |
| 11 | k=2 | 5 |
| 12 | k=2 | 6 |
| 13 | k=3 | 3 |
| 14 | k=3 | 4 |
| 15 | k=3 | 5 |
| 16 | k=3 | 6 |

FIG. 12

| STEP | BIT DIGIT OF MUTIPLICATION ELEMENT $a_i^k$ | BLOCK ADDRESS |
|---|---|---|
| 1 | k=0, i=[1:M/2] | 3 |
| 2 | k=0, i=[1:M/2] | 4 |
| 3 | k=1, i=[1:M/2] | 3 |
| 4 | k=1, i=[1:M/2] | 4 |
| 5 | k=0, i=[M/2+1:M] | 5 |
| 6 | k=0, i=[M/2+1:M] | 6 |
| 7 | k=1, i=[M/2+1:M] | 5 |
| 8 | k=1, i=[M/2+1:M] | 6 |

*FIG. 14*

| STEP | BIT DIGIT OF MUTIPLICATION ELEMENT $a_i^k$ | BLOCK ADDRESS |
|---|---|---|
| 1 | k=0, i=[1:M/4] | 3 |
| 2 | k=0, i=[M/4+1:M/2] | 4 |
| 3 | k=0, i=[M/2+1:3M/4] | 5 |
| 4 | k=0, i=[3M/4+1:M] | 6 |

MULTIPLY-ACCUMULATE OPERATION DEVICE, MULTIPLY-ACCUMULATE OPERATION METHODS, AND SYSTEMS

CROSS-REFERENCE TO RELATED APPLICATIONS

The disclosure of Japanese Patent Application No. 2018-167802 filed on Sep. 7, 2018 including the specification, drawings and abstract is incorporated herein by reference in its entirety.

BACKGROUND

In Deep Neural Network (DNN), the multiply-accumulate operation of multiple elements is known to be the dominant factor in the process times. In Non-Patent Document 1 "In-Memory Computation of a Machine-Learning Classifier in a Standard 6T SRAM Array", there is disclosed a technique for performing a multiply-accumulate operation within a memory array. In Non-Patent Document 1, a memory cell array configuration is used, and a plurality of memory cells connected to corresponding bit line are simultaneously driven to be charged and discharged. In this manner, a plurality of multiplication results are simultaneously added.

In general, an input of a word line for accessing a memory cell array is a digital value of 0/1, and a multiply-accumulate operation using a 1-bit input may cause a decrease in recognition accuracy in an application such as general object recognition. Therefore, the recognition accuracy can be improved by performing the multiply-accumulate operation using the multi-value bit input. However, in a normal memory cell array, it is necessary to increase the memory size in order to perform an operation using a multi-value bit input. For example, in order to perform the operation with unsigned multi-value bit input of 4-bit, multiplied elements are stored for 16 (=2^4) cells in the same bit line direction. In Non-Patent Document 1, a DAC (Digital to Analog Converter) is provided at an input portion in order to use multi-value bit input. The voltage applied to the word line is controlled as an analog value so as to correspond to a multi-value bit, thereby performing a multiplication process in a multi-value bit input.

In Japanese unexamined Patent Application publication No. 2017-79017 (Patent Document 1), there is disclosed a digital architecture level technique for a DNN. In Patent Document 1, a shift register is provided in an input data portion.

SUMMARY

One of the features of the DNN algorithm is that the same data is repeatedly accessed many times. Therefore, in Patent Document 1, data is reused in a local register by using the above-mentioned shift register. As a result, the number of accesses to the main memory can be reduced, and redundant memory accesses, power overhead associated therewith, and the like can be suppressed. Further, Patent Document 1 adopts a method of accumulation addition while shifting the timing of multiplying the elements to be accumulated and added at the time of the multiply-accumulate operation.

In Patent Document 1, timing for performing multiplication, which is an element of accumulation addition, is shifted. However, it is difficult to apply the multiply-accumulate operation disclosed Patent Document 1 to that of Non-Patent Document 1 in which multiply-accumulate operations are performed simultaneously.

In Non-Patent Document 1, when a multi-value bit input operation is performed, a circuit such as a DAC is required for an input portion of a memory. Although the power efficiency in the multiply-accumulate operation inside the memory array is increased, there is a problem that energy is consumed when generating input data to the memory array. Further, when the multiply-accumulate operation is performed in the memory cell array, it is necessary to drive a large number of word lines simultaneously. For this reason, a DAC circuit is required for each column of the array, energy consumption and area overhead are increased. Further, in the arithmetic operation using the analog input, the arithmetic operation result is susceptible to the influence of the variation, and a problem that the reliability of the arithmetic operation result is lowered occurs. In other words, even when the DAC circuit is provided to use the multi-value bit input, there is a possibility that the recognition accuracy on the application is not improved.

Other objects and novel features will become apparent from the description of this specification and the accompanying drawings.

According to one embodiment, the multiply-accumulate operation device comprises a plurality of memory blocks storing a plurality of multiplied elements and performing a multiply-accumulate operation on input data, wherein one memory block stores one bit value of the same bit digit of the plurality of multiplied elements as a first bit value, and an input data generator for extracting a second bit value of the same bit digit from the plurality of multiplication elements to generate the input data.

According to the above-mentioned embodiment, it is possible to efficiently perform the multiply-accumulate operation.

BRIEF DESCRIPTION OF THE DRAWINGS

FIG. 6 is a table showing the bit digits of multiplication elements and block addresses of each step in the arithmetic operation flow of the memory block;

FIG. 12 is a table showing the bit digits of the multiplication elements and the block address when K=2 bits;

FIG. 14 is a table showing bit digits of a multiplication element and a block address when K=1 bit;

DETAILED DESCRIPTION

Figure 1:
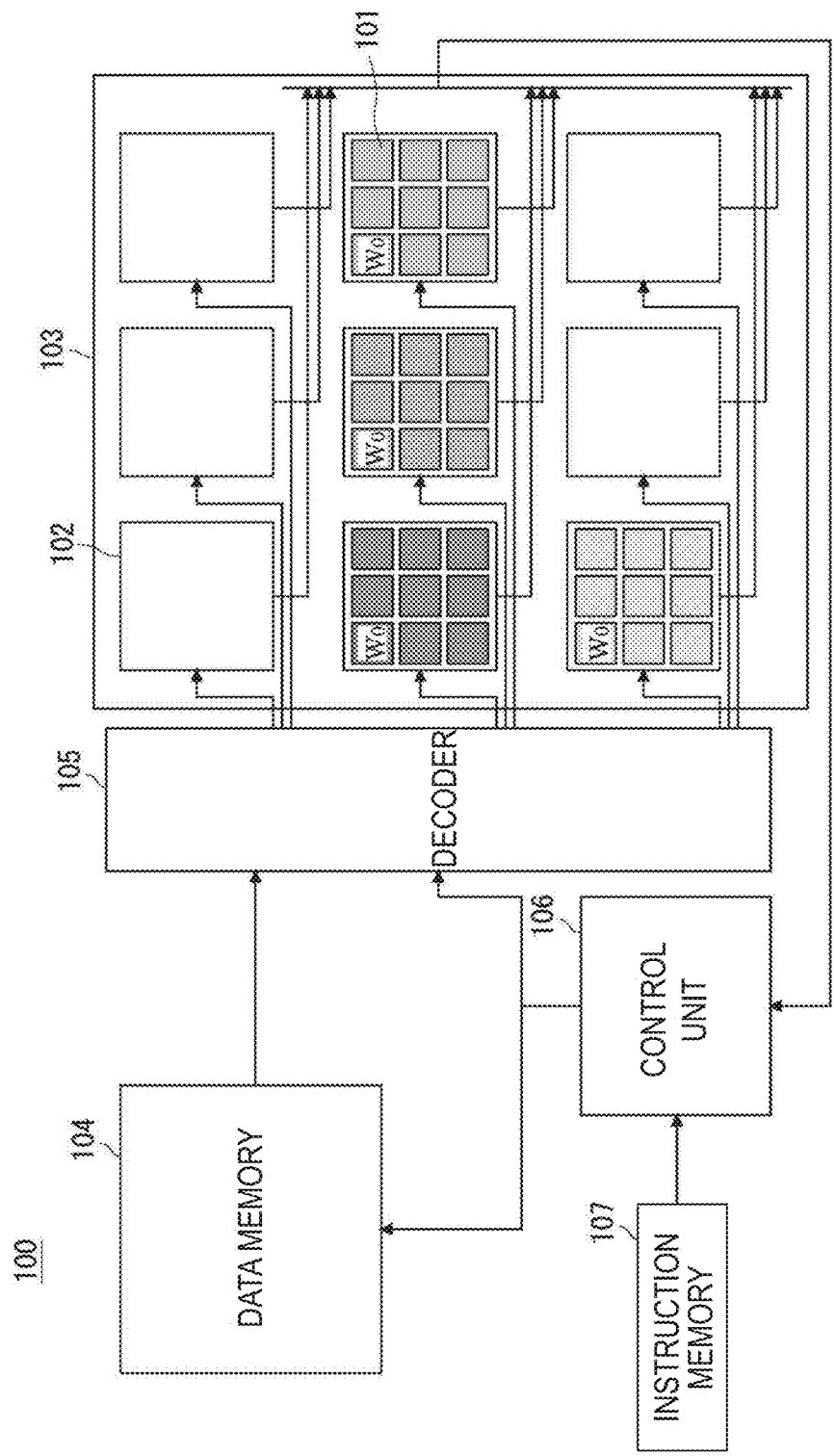
FIG. 1 is a block diagram showing the configuration of the multiply-accumulate operation device according to a first embodiment.

For clarity of explanation, the following description and drawings are appropriately omitted and simplified. In addition, the respective elements described in the drawings as functional blocks for performing various processes can be configured by a CPU (Central Processing Unit), a memory, and other circuits in terms of hardware, and are realized by programs loaded in the memory in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

In the following explanation, a multiply-accumulate operation device for performing a multiply-accumulate operation on multiplied elements and multiplication elements, and the multiply-accumulate operation process will be explained. For example, the multiply-accumulate operation device uses weighting parameters used for CNN (Convolution Neural Network) as the multiplied elements, and inputs data as the multiplication elements. The multiplied elements are values obtained by machine learning such as deep learning. The multiplication elements are, for example, a feature amount or the like obtained based on detection data detected by a sensor such as a camera.

The multiplication element and the multiplied element are respectively multi-bit or 1-bit data. The multiply-accumulate operation device performs a multiply-accumulate operation of a plurality of multiplication elements and a plurality of multiplied elements. The value obtained by the multiply-accumulate operation becomes multiplication elements used for the multiply-accumulate operation of the next layer of the CNN.

For example, the multiply-accumulate operation device performs a multiply-accumulate operation on m multiplication elements (m is an integer equal to or greater than 2) and m multiplied elements in one multiply-accumulate operation. That is, the multiply-accumulate operation device multiplies m multiplication elements by the data of the corresponding m multiplied elements to obtain m products. Then, the multiply-accumulate operation device obtains the sum of m products as multiply-accumulate operation value. This multiply-accumulate operation value becomes multiplication elements of the next multiply-accumulate operation. For example, the multiply-accumulate operation value is used for the multiply-accumulate operation of the next layer of the CNN. In this manner, the multiply-accumulate operation device repeatedly performs the multiply-accumulate operation. Therefore, in the present embodiment, the multiply-accumulate operation device includes a plurality of memory blocks for performing the multiply-accumulate operation.

First Embodiment

FIG. 1 is a block diagram showing a configuration of a multiply-accumulate operation device 100 according to the first embodiment according to the first embodiment. The multiply-accumulate operation device 100 includes memory cells 101, memory blocks 102, a block array 103, a data memory 104, decoder 105, a control unit 106, and an instruction memory 107.

The memory cells 101 store bit data of a multiplied element, respectively. Specifically, one memory cell 101 stores one bit of data. As the memory cell, for example, a memory cell such as a SRAM (Static Random Access Memory, a flash memory, a MRAM (Magnetoresistive Random Access Memory, a ReRAM (Resistive Random Access Memory, or a FeRAM (Ferroelectric Random Access Memory can be used.

The memory block 102 includes a plurality of memory cells 101. In the memory block 102, memory cells 101 are arranged in an array. The memory block 102 includes a plurality of word lines and a plurality of bit lines. Further, the memory block 102 has a multiply-accumulate operation function. Specifically, the memory block 102 has a function of simultaneously accessing data of the memory cells, and has a function of reading data stored in a plurality of memory cells 101. Each of the memory blocks 102 further includes an A/D (Analog to Digital) converter for converting an output value corresponding to a bit-line potential into a digital value.

Each of memory blocks 102 collectively stores data of the same digit of the multiplied elements. Therefore, one memory block 102 stores data of the same digit of the multiplied elements used for the multiply-accumulate operation.

The block array 103 includes a plurality of memory blocks 102. Although in FIG. 1, the block array 103 includes 3×3, that is, nine memory blocks 102, the number of memory blocks 102 included in the block array 103 is not particularly limited.

The data memory 104 is a main memory for storing multiplication elements. The data memory 104 has a data reading function and a data writing function. The data memory 104 stores the multiply-accumulate operation value based on the operation result of the memory block 102 as multiplication elements of the next multiply-accumulate operation.

The decoder 105 receives a plurality of multiplication elements from the data memory 104. Then, the decoder 105 selects the values of the same digit of the plurality of multipier elements to obtain input data. The decoder 105 outputs the input data to the memory block 102 corresponding to the specified address. The input data is composed of data of the same digit included in the plurality of multiplication elements. For example, the input data is composed of data of the number of bits corresponding to the number of multiplication elements used for one multiply-accumulate operation.

Figure 2:
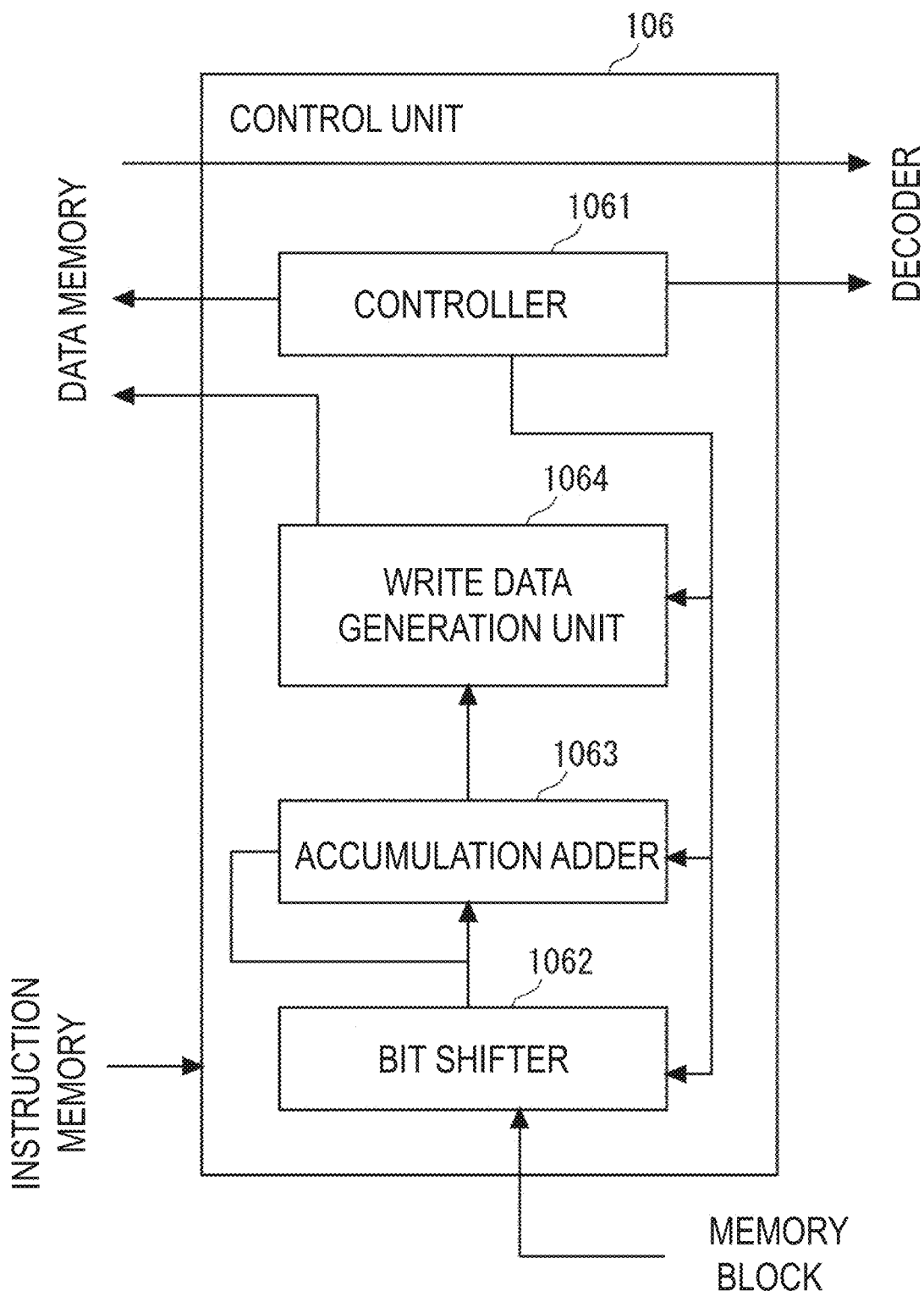
FIG. 2 is a block diagram illustrating a configuration of a control unit.

The control unit 106 controls the multiply-accumulate calculation device 100. Specifically, the data of the multiplication elements are read out from the data memory 104. The control unit 106 supplies the data read from the data memory 104 to the decoder 105. The control unit 106 controls the digit of the multiplication element selected by the decoder 105. Further, the control unit 106 controls selection of a block address and input data. The control unit 106 outputs information for specifying a block address of the memory block 102 to which input data is supplied to the decoder 105. Further, the control unit 106 receives an operation value, which is a multiply-accumulate operation result, from the memory block 102. FIG. 2 is a block diagram showing a configuration of the control unit 106. The control unit 106 includes a controller 1061, a write data generation unit 1064, an accumulation adder 1063, and a bit shifter 1062. The controller 1061 controls the multiply-accumulate operation device 100. The bit shifter 1062 performs a shift operation on the operation value received from the memory block 102 in accordance with the digit of the multiplication elements and the multiplied elements, and supplies the result to the accumulation adder 1063. The accumulation adder 1063 adds the value of the bit shifter 1062 to the accumulation added value up to the previous step, and stores it. When the multiply-accumulate operation of all the digits is completed, the control unit 106 generates write data in the write data generation unit 1064 based on the digits of the specified multiplication data and the operation value. The control unit 106 writes the write data to the specified address of the data memory 104. The write data written in the data memory 104 becomes multiplication elements of the next multiply-accumulate operation.

The instruction memory 107 stores the number of bits of the multiplication element and the number of bits of the multiplied element. The instruction memory 107 stores a write address and a read address of the data memory 104. The instruction memory 107 stores address information of the memory block 102. The control unit 106 sequentially reads out data such as the number of bits and addresses stored in the instruction memory 107. Then, the control unit 106 performs control related to the multiply-accumulate operation based on data such as the number of bits and the address. As a result, the control unit 106 can supply appropriate input data to the memory block 102 corresponding to an appropriate block address.

Figure 3:
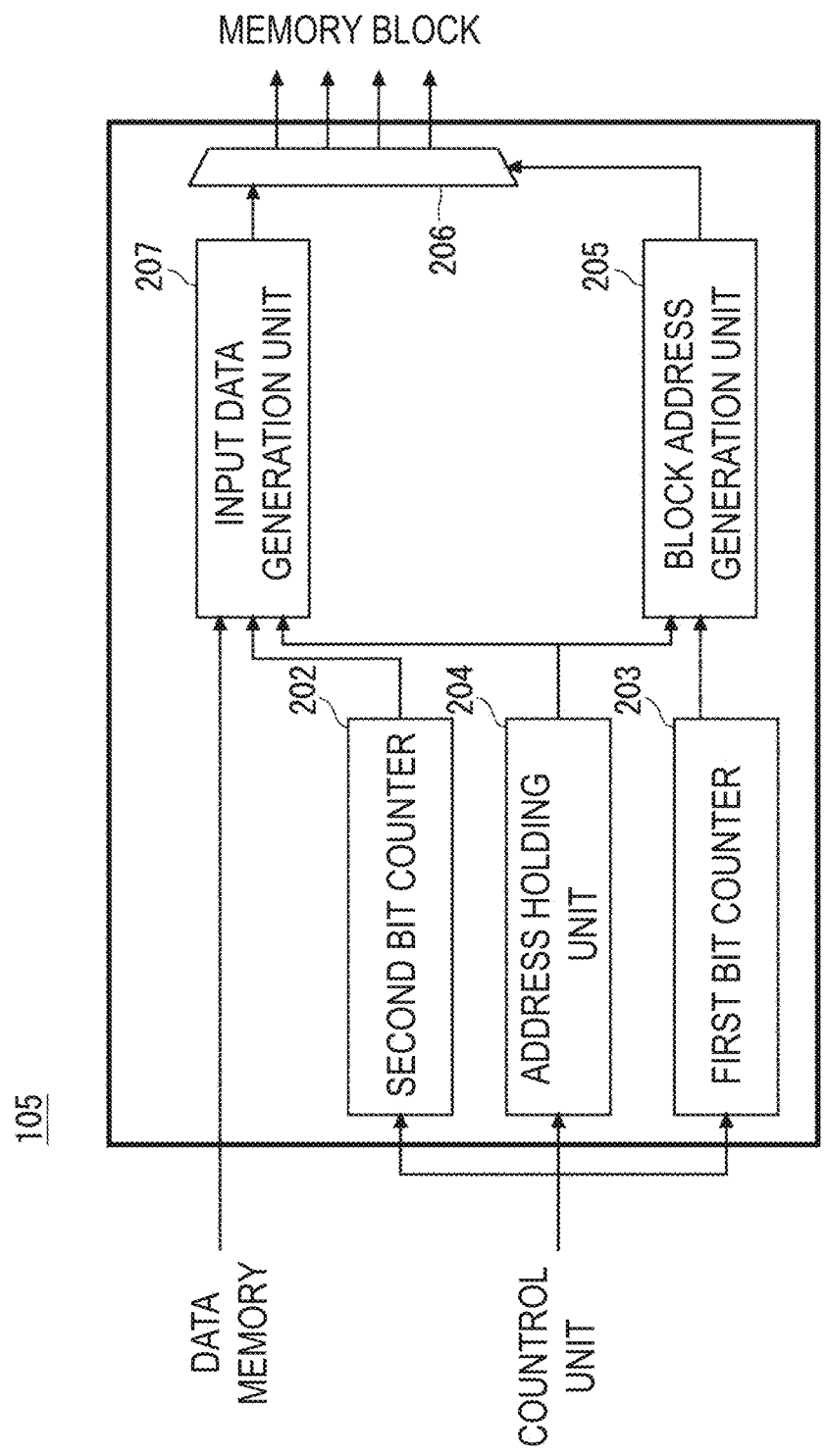
FIG. 3 is a block diagram illustrating a configuration of a decoder.

Next, the decoder 105 will be described with reference to FIG. 3. FIG. 3 is a block diagram showing a configuration of the decoder 105. The decoder 105 includes a second bit counter 202, a first bit counter 203, an address holding unit 204, a block address generation unit 205, a selector 206, and an input data generation unit 207.

The first bit counter 203 is a first holding unit that holds first bit digit information corresponding to a bit digit of multiplied element. The second bit counter 202 is a second holding unit that holds second bit digit information corresponding to the bit digit of the multiplication element. The address holding unit 204 holds the memory address of the multiplication elements read from the data memory 104. The block address generation unit 205 refers to the memory address and the first bit digit information, and generates a block address specifying a memory block. The block address generation unit 205 outputs the block address to the selector 206.

The input data generation unit 207 temporarily holds the multiplication elements from the data memory 104. The input data generation unit 207 divides the multiplication elements into bit digits based on the number of bits of the multiplication element and the memory address. Then, the input data generation unit 207 selects the bit digit of the multiplication element and generates input data to the specified memory block. The input data is a set of data of the same bit digit of a plurality of multiplication elements. That is, the input data generation unit 207 extracts data of the same bit digit from the plurality of multiplication elements, and outputs the extracted data as input data to the selector 206.

The selector 206 outputs the input data from the input data generation unit 207 to the corresponding memory block 102.

That is, the selector 206 outputs the input data to the memory block 102 corresponding to the block address generated by the block address generation unit 205.

Figure 4:
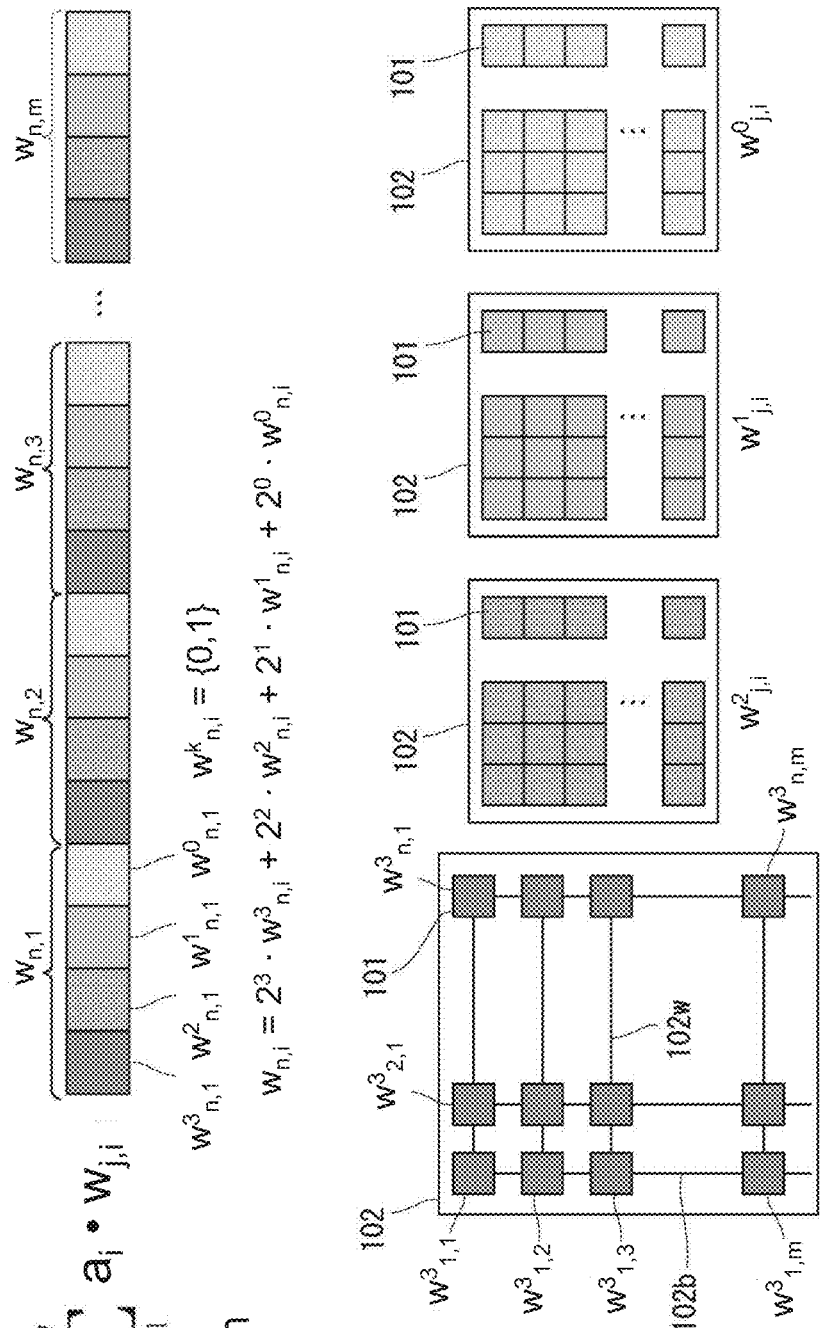
FIG. 4 is a diagram for explaining a data storage method between memory blocks.

FIG. 4 shows a data storage method of the multiplied elements in the memory block 102. FIG. 4 shows an example in which each of the multiplied elements is 4-bit data. Here, the $a_i$ is one of the multiplication elements, and the $w_{j,i}$ is one of the multiplication elements. Note that i is an arbitrary integer from 1 to m, and j is an arbitrary integer from 1 to n. In one multiply-accumulate operation, a multiply-accumulate operation of m multiplied elements (m is an integer of 2 or more) and m multiplied elements is performed. That is, m multiplication elements are multiplied by corresponding multiplied elements to obtain m products. The sum total of m products becomes one multiply-accumulate operation value $o_j$ obtained by the multiply-accumulate operation of $w_{j,i}$ and $a_i$.

The $w_{n,i}$ is 4-bit data and is composed of 0 to 3 bit digits (also referred to simply as digits). In the $w_{n,i}$, the data of the 0th digit is defined as the $w^0_{n,i}$, the data of the 1st digit is defined as the $w^1_{n,i}$, the data of the 2nd digit is defined as the $w^2_{n,i}$, and the data of the 3rd digit is defined as the $w^3_{n,i}$. The $w_{j,i}$ can also be represented in the same manner as the $w_{n,i}$.

The data of the respective digits is 1-bit data, the $w^k_{n,i}$ indicates either 0 or 1. Note that k is a value indicating a bit digit, and is an arbitrary integer from 0 to 3. The $w_{n,i}$ is given by the following equation:

$$w_{n,i}=2^3 \cdot w^3_{n,i}+2^2 \cdot w^2_{n,i}+2^1 \cdot w^1_{n,i}+2^0 \cdot w^0_{n,i}$$

The $w_{j,i}$ is stored in different memory blocks 102 depending on the number of bit digit. For example, one memory block 102 stores data $w^3_{1,1}$ to $w^3_{n,m}$ of the third digit, that is, m×n pieces of 1-bit data. The $w^3_{1,1}$ to $w^3_{n,m}$ are generalized and denoted as $w^3_{i,j}$. The following memory block 102 stores data $w^2_{i,j}$ of the second digit, i.e., data $w^2_{1,1}$ to data $w^2_{n,m}$. The other two memory blocks 102 store the first digit data $w^1_{i,j}$ (i.e., $w^1_{1,1}$ to $w^1_{n,m}$) and the zero digit data $w^0_{i,j}$ (i.e., $w^0_{1,1}$ to $w^0_{n,m}$), respectively. Each of memory blocks 102 stores (n×m) pieces of one-bit data, that is, (n×m) bits of data.

Therefore, each of the memory blocks 102 includes m×n memory cells 101, and each memory cell 101 stores one bit of data. The memory block 102 includes n bit lines 102b and m word lines 102w. In m cells corresponding to one bit line 102b, data of the same bit digit of m multiplied elements is stored. For example, FIG. 4 shows the memory block 102 storing multiplied elements $w^3_{1,1}$ to $w^3_{n,m}$. As shown in FIG. 4, in the memory cells 101 corresponding to the first bit line 102b, $w^3_{1,1}$ to $w^3_{1,m}$ are stored. In this configuration, since the memory block 102 simultaneously performs a multiply-accumulate operation with n rows of multiplied elements with respect to the input of m multiplication elements, m×n multiply-accumulate operations are simultaneously performed.

Data of the same bit digit of m multiplication elements are collectively supplied from m word lines 102w to the memory cells 101. At this time, the word line of the row in which "1" is stored as the value of the multiplication element is driven, and the bit line is charged and discharged in accordance with the value of the memory cell in which the multiplication element is stored. The word line of the row in which "0" is stored as the value of the multiplication element is not driven, and no charge/discharge occurs to the bit line regardless of the value of the memory cell in which the multiplication element is stored. In this manner, data of the same bit digit of m multiplication elements can be simultaneously supplied to the data $w^3_{1,1}$ to $w^3_{1,m}$ of the same bit digit of m multiplied elements used for one multiply-accumulate operation. A read circuit (not shown) reads the bit line potential and performs A/D conversion. Then, the digital value is output to the control unit 106.

Thus, one multiplied element is stored in a different memory block 102 for each digit. When one multiplied element is 4-bit data, one multiplied element is stored in four memory blocks 102 in a distributed manner. In the case of a general memory storage format, data is stored in the same memory block in a data unit (one element unit of multiplication in the multiply-accumulate operation). This is because, when one multiplied element data is stored in different blocks in a distributed manner for each digit, a plurality of accesses and redundant reading of data occur in a digital arithmetic unit-based usage method. Therefore, generally, data stored in a 4-bit format is stored in the same memory block.

Figure 5:
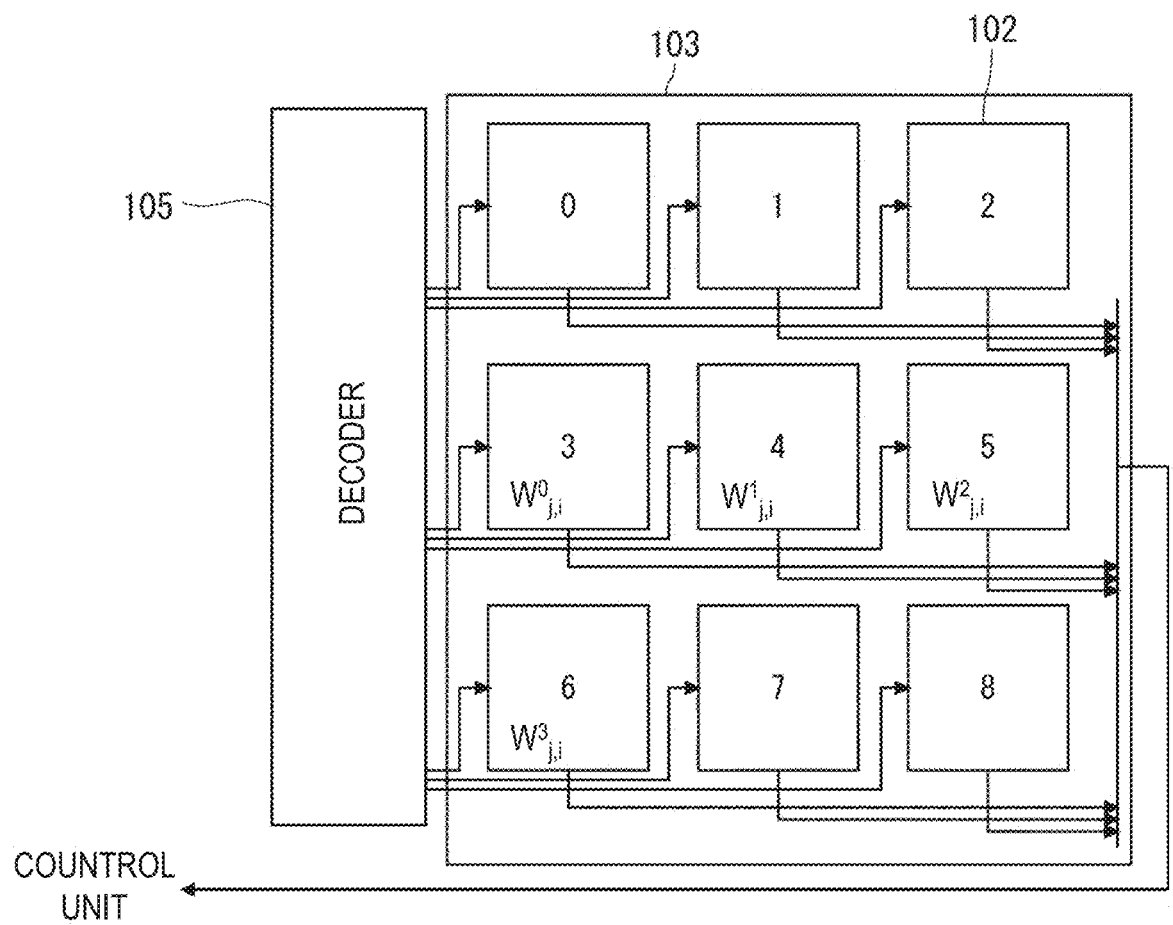
FIG. 5 is an arithmetic operation flow of a memory block.
Figure 7:
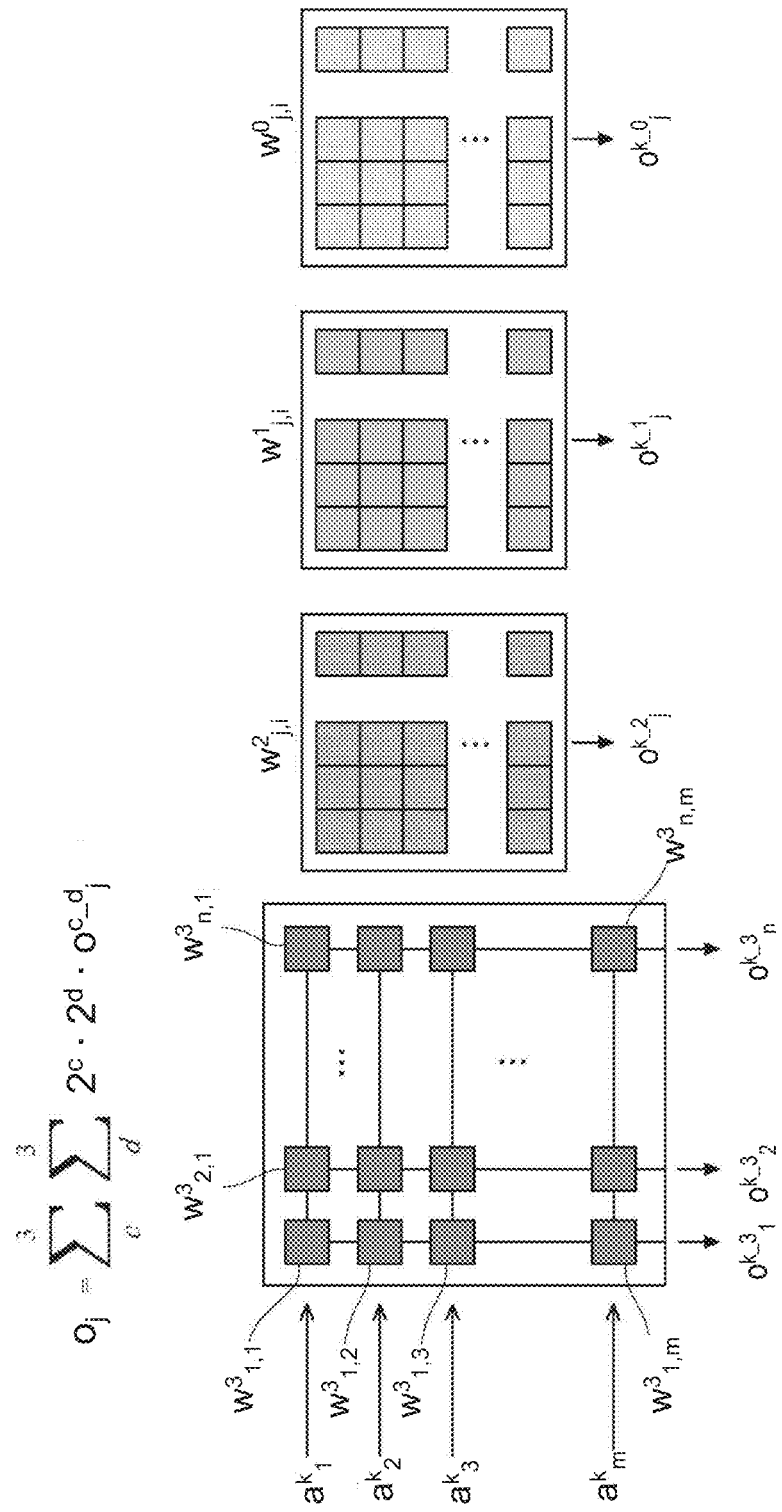
FIG. 7 is an arithmetic operation in a memory block.
Figure 8:
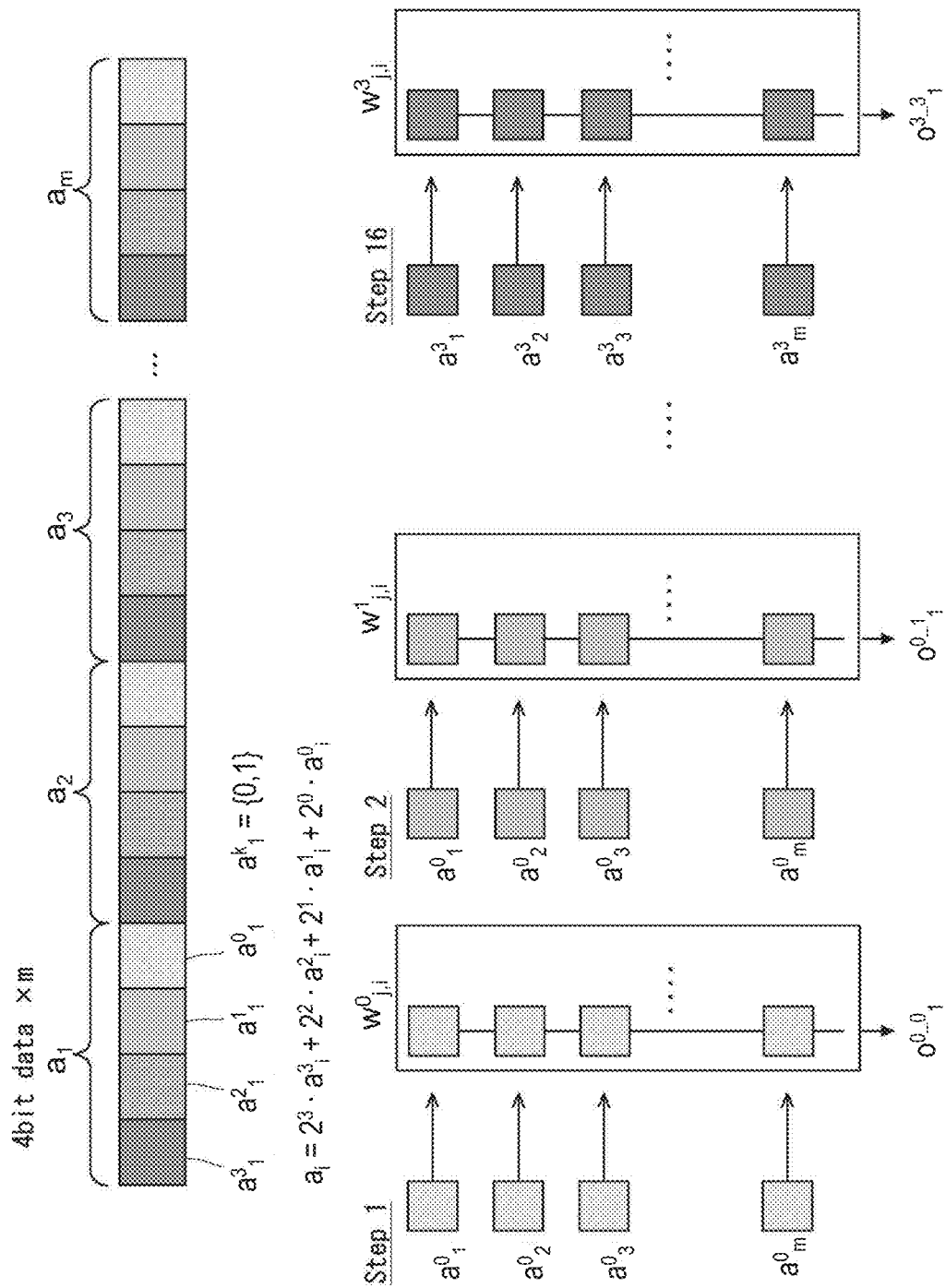
FIG. 8 is a diagram for explaining processing in an input data generation unit.

The operation processing in the memory block will be described with reference to FIGS. 5 to 8. FIG. 5 is a diagram showing a flow of a multiply-accumulate operation in a memory block. FIG. 6 is a table showing block addresses and bit digits for each step. FIG. 7 is a diagram showing operations in one memory block 102. FIG. 8 is a diagram showing input data generated by the decoder.

In the following explanation, it is assumed that one multiplication element $a_i$ is 4-bit data. Assume that the $a_i$ is composed of 0 to 3 bit digits. In the $a_i$, the data of the 0th digit is defined as $a^0_i$, the data of the 1st digit is defined as $a^1_i$, the data of the 2nd digit is defined as $a^2_i$, and the data of the 3rd digit is defined as $a^3_i$. $a^k_i$ a represents either 0 or 1. Note that i is an arbitrary integer of 1 to m, and k is an arbitrary integer of 0 to 3. The $a_i$ is represented by the following equation:

$$a_i = 2^3 \cdot a^3_i + 2^2 \cdot a^2_i + 2^1 \cdot a^1_i + 2^0 \cdot a^0_i$$

Here, as shown in FIG. 5, it is assumed that the block array 103 includes nine memory blocks 102, and the block addresses thereof are 0 to 8. The memory block 102 of the block address 3 stores the data $w^0_{j,i}$ of the 0th digit of the multiplied elements $w_{j,i}$. The memory block 102 of the block address 4 stores the data $w^1_{j,i}$ of the first digit of the multiplied elements $w_{j,i}$. Similarly, the memory block 102 of the block addresses 5 and 6 stores the data $w^2_{j,i}$ of the second digit and the data $w^3_{j,i}$ of the third digit of the multiplied elements $w_{j,i}$, respectively.

Let c be the bit digit of the multiplication element and d be the bit digit of the multiplied element. Each of c and d is an integer of 0 or more. Here, since the multiplication element and the multiplied element are 4 bits, c and d are 0, 1, 2, or 3, respectively. Since the multiplied element and the multiplication element are 4-bit data, the multiply-accumulate operation device 100 repeats the steps (hereinafter, steps 1 to 16) 16 times (=4×4). That is, one multiply-accumulate operation is time-divided into 16 steps and performed.

First, in Step 1, as shown in FIG. 8, the decoder 105 generates the input data summarizing the data $a^0_0$ to $a^0_m$ of the 0th bit of the multiplication element $a_i$. The m pieces of data $a^0_0$ to $a^0_m$ are collectively referred to as input data $a^0_i$. The decoder 105 outputs the input data $a^0_i$ to the memory block 102 at the block address 3. The memory block 102 of the block address 3 outputs the result of the multiply-accumulate operation of the $a^0_i$ and the $w^0_{j,i}$ (i.e., the first step operation value $O^{0-0}_1$) to the control unit 106. In the bit shifter 1062, the control unit 106 multiplies the first step operation value $O^{0-0}_1$ by a value (1=$2^c$) corresponding to the bit digit (c=0) of the multiplication element and a value (1=$2^d$) corresponding to the bit digit (d=0) of the multiplied element to obtain a multiplication value. The multiplication value is added to an accumulation adder 1063. The control unit 106 stores the multiplication value as the accumulated adding value in the accumulation adder 1063. The accumulated adding value at step 1 is the $O^{0-0}_1$.

In Step 2, similarly to Step 1, the data $a^0_0$ to $a^0_m$ are inputted. The decoder 105 outputs the input data $a^0_i$ to the memory block 102 at the block address 4. The memory block 102 at the block address 4 outputs the result of the multiply-accumulate operation of the $a^0_i$ and the $w^1_{j,i}$ (i.e., the second step operation value $O^{0-0}_1$) to the control unit 106. In the bit shifter 1062, the control unit 106 multiplies the second step operation value $O^{0-0}_1$ by a value (1=$2^c$) corresponding to the bit digit c (c=0) of the multiplication element and a value (2=$2^d$) corresponding to the bit digit d (d=1) of the multiplied element to obtain a multiplication value $cdO^{0-1}_1$. Then, the control unit 106 adds the multiplication value $cdO^{0-1}_1$ to the accumulated adding value at step 1 in the accumulation adder 1063, and updates the accumulated adding value. The accumulated adding value at step 2 is $2 \times O^{0-1}_1 + O^{0-0}_1$.

In step 3, the data $a^0_0$ to $a^0_m$ are input data, similarly to steps 1 and 2. The decoder 105 outputs the input data $a^0_i$ to the memory block 102 of the block address 5 storing the $w^2_{j,i}$. The memory block 102 of the block address 5 outputs the result of the multiply-accumulate operation of the $a^0_i$ and the $w^2_{j,i}$ (i.e., the third step operation value $O^{0-2}_1$) to the control unit 106. In the bit shifter 1062, the control unit 106 multiplies the third step operation value $O^{0-2}_1$ by a value (1=$2^c$) corresponding to the bit digit c (c=0) of the multiplication element and a value (4=$2^d$) corresponding to the bit digit d (d=2) of the multiplied element to obtain a multiplication value $cdO^{0-2}_1$. Then, the control unit 106 adds the multiplication value $cdO^{0-2}_1$ to the accumulated adding value at step 2 in the accumulation adder 1063, and updates the accumulated adding value. The accumulated adding value at step 3 is $4 \times O^{0-2}_1 + 2 \times O^{0-1}_1 + O^{0-0}_1$.

In step 4, the data $a^0_0$ to $a^0_m$ are input data, similarly to steps 1 and 2. The decoder 105 outputs the input data $a^0_i$ to the memory block 102 of the block address 6 storing the $w^3_{j,i}$. The memory block 102 of the block address 6 outputs the result of the multiply-accumulate operation of the $a^0_i$ and the $w^3_{j,i}$, which is the fourth step operation value $O^{0-3}_1$, to the control unit 106. In the bit shifter 1062, the control unit 106 multiplies the fourth step operation value by a value (1=$2^c$) corresponding to the bit digit c of the multiplication element and a value (8=$2^d$) corresponding to the bit digit d (d=3) of the multiplied element to obtain a multiplication value $cdO^{0-3}_1$. Then, the control unit 106 adds the multiplication value $cdO^{0-3}_1$ to the accumulated adding value at step 3 in the accumulation adder 1063, and updates the accumulated adding value. The accumulated adding value at step 4 is $8 \times O^{0-3}_1 + 4 \times O^{0-2}_1 + 2 \times O^{0-1}_1 + O^{0-0}_1$.

In step 5, the decoder 105 generates the input data in which the data $a^1_0$ to $a^0_m$ of the 0th bit of the multiplication element $a_i$ is summarized. The m pieces of data $a^1_0$ to $a^1_m$ are collectively referred to as input data $a^1_i$. The decoder 105 outputs the input data $a^1_i$ to the memory block 102 of the block address 3 storing the $w^0_{j,i}$. The memory block 102 of the block address 3 outputs the result of the multiply-accumulate operation of the $a^1_i$ and the $w^0_{j,i}$ (i.e., the fifth step operation value $O^{1-0}_1$) to the control unit 106.

In the bit shifter 1062, the control unit 106 multiplies the fifth step operation value $O^{1-0}_1$ by a value (2=$2^c$) corresponding to the bit digit c (c=1) of the multiplication element and a value (1=$2^d$) corresponding to the bit digit d (d=0) of the multiplied element to obtain a multiplication value $cdO^{1-0}_1$. Then, the control unit 106 updates the accumulated adding value by adding the multiplication value $cdO^{1-0}_1$ to the accumulated adding value at step 4 in the accumulation adder 1063. The cumulative sum at 5 is $2 \times O^{1-0}_1 + 8 \times O^{0-3}_1 + 4 \times O^{0-2}_1 + 2 \times O^{0-1}_1 + O^{0-0}_1$.

Thereafter, the multiply-accumulate operation device 100 repeats the above-described process up to step 16. FIG. 6 shows the bit digits and block addresses of the multiplication elements in steps 1 to 16. Steps 6 to 16 are performed according to the bit digits and block addresses shown in FIG. 6. The control unit 106 multiplies the multiply-accumulate operation result $O^{c-d}_j$ in the respective steps by the value $(2^c)$ corresponding to the bit digit c of the multiplication element and the value $(2^d)$ corresponding to the bit digit d of the multiplied element in the bit shifter 1062 to obtain a multiplication value. Then, the control unit 106 accumulates and adds the multiplication value in the accumulation adder 1063, and overwrites and stores the accumulated adding value. After the processes up to step 16 is completed, the control unit 106 converts the accumulated adding result into the data of the largest bit digit of the multiplication element in the write data generation unit 1064, and stores the data in the data memory 104. The multiply-accumulate operation device 100 repeats the multiply-accumulate operation and the accumulative addition operation, thereby realizing a multiply-accumulate operation with multi-value bits using the memory blocks 102.

In order to perform the above-described processes, the decoder 105 extracts m pieces of 1-bit data, which is the same bit digit of m multiplication elements, to use as the input data. The input data, which is m-bit data, is arranged in the column direction of the memory block 102 and supplied to the memory block 102.

In the column direction of the memory block 102, data of the same bit digit of a multiplied element is stored. Then, data of the same bit digit of a plurality of multiplication elements are input in the column direction of the memory block 102. The memory block 102 performs the multiply-accumulate operation of the data of a certain bit digit of the multiplication elements with the a certain bit digit of the multiplied elements. Then, the memory block 102 repeatedly obtains multiply-accumulate operation value by changing the combination of bit digits in order. Further, the sum of the multiplication values obtained by multiplying the multiply-accumulate operation value by the value corresponding to the bit digit becomes a multiplication element of the multiply-accumulate operation of the next layer. By doing so, it is possible to efficiently perform the multiply-accumulate operation for the convolution operation. The multiply-accumulate operation device 100 similarly performs a multiply-accumulate operation using the following multiplication elements.

In the present embodiment, the multiplied element is divided for each bit digit, and each bit is stored in a different memory block. Further, a multiplication element serving as input data is divided for each bit digit, and the data of each digit is supplied to the memory block 102 by time division. As a result, it is possible to realize a multiply-accumulate operation of multi-valued bits using memory blocks.

By using this configuration, it is possible to generate multi-valued input data as it is in a digital representation with respect to a processor including a multiply-accumulate operation circuit array using memory elements. Therefore, a multi-bit multiply-accumulate operation can be performed without an additional cost of a DAC or the like. For example, there is no need to provide a DAC in an input stage for inputting input data to memory blocks.

In the above description, an example has been described in which data of each bit digit of the multiplied element and data of each bit digit of the multiplication elements are processed in ascending order, but the order of processing the data is not particularly limited. For example, the decoder 105 may provide data to the block array 103 such that the data of each digit of the multiplied element and the multiplication element are processed in descending order. More specifically, when the bit digits of the multiplied element are processed in descending order, the input data may be supplied to the memory block 102 that stores the data of the third bit digit of the multiplied element, and then supplied to the memory block 102 that stores the data of the second bit digit of the multiplied element. When the bit digits of the multiplication element are processed in descending order, the decoder may generate the data of the third bit digit of the plurality of multiplication elements as the input data, and then generate the data of the second bit digit of the multiplication elements as the input data.

In the present embodiment, the data of the multiplication element and the multiplied element are described as 4-bit data, but these data are not limited to 4 bits. By increasing the block memory for storing the multiplied elements, it is possible to arbitrarily expand the number of bit digits of the multiplied elements. In addition, the number of bit digits of the multiplication element to be input can be arbitrarily expanded by increasing the time division number (step number), and the optimum number of bit digits can be set according to the recognition accuracy and the processing speed for each application while using the same hardware configuration.

Second Embodiment

In the present embodiment, the data storage format of the data memory 104 and the configuration of the input data generation unit 207 are different from those in the first embodiment. The basic configuration other than the data storage format of the data memory 104 and the input data generation unit 207 is the same as that of first embodiment. For example, the data storage format of the memory block 102 is the same as that of first embodiment. Descriptions of the same content as that of first embodiment will be omitted as appropriate.

Figure 9:
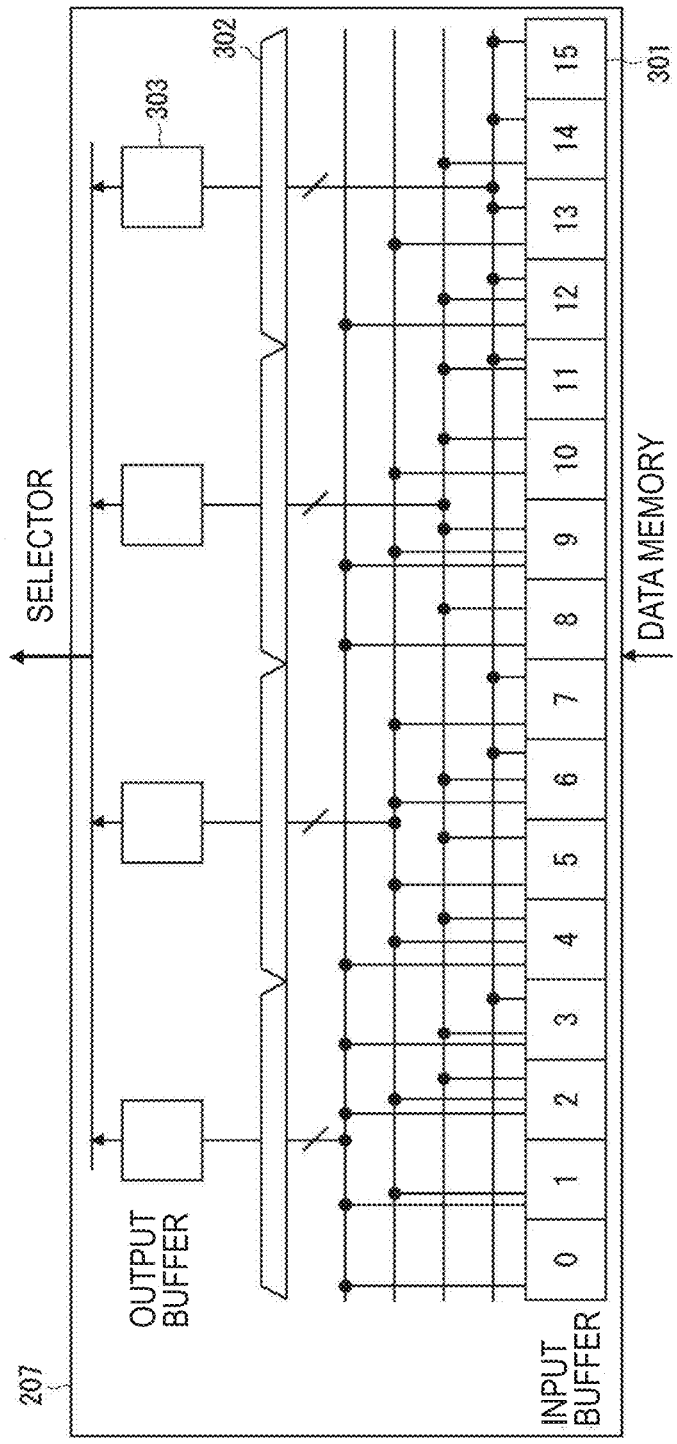
FIG. 9 is an input data generation unit according to a comparison example.
Figure 10:
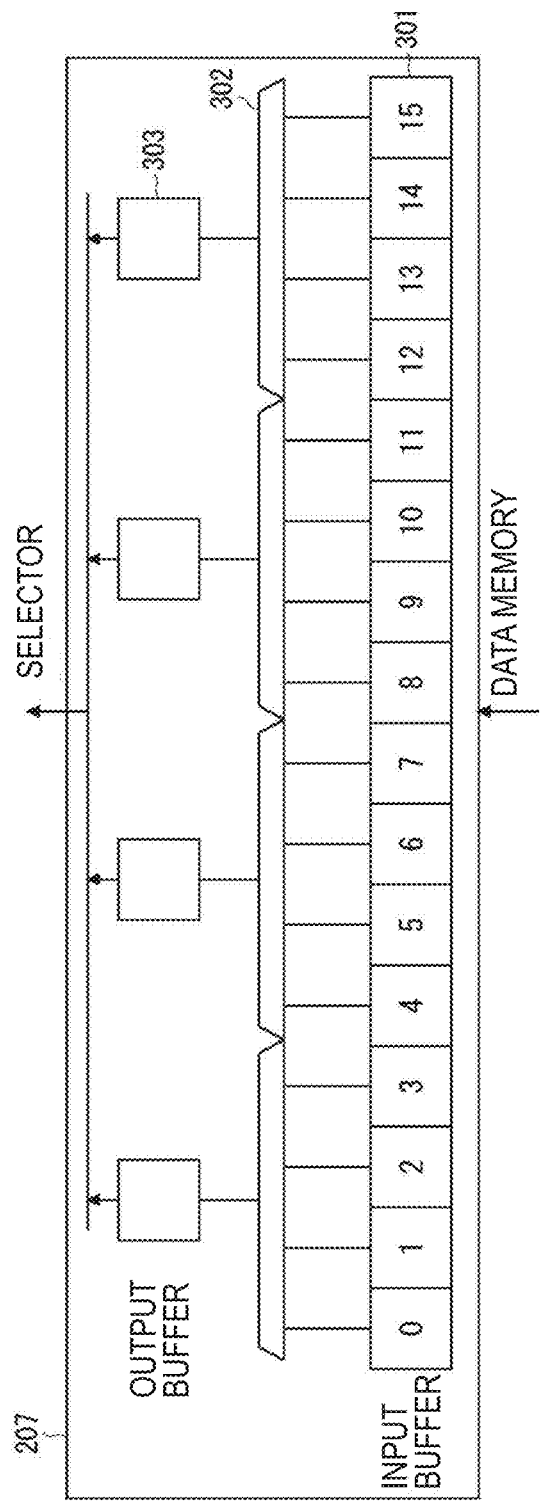
FIG. 10 is an input data generating unit according to a second embodiment.

In present embodiment, the data storage format of the data memory 104 is improved to realize bit scalability. Further, the circuit configuration of the decoder 105 can be simplified to improve the area and speed. FIG. 9 is a block diagram showing a configuration of the input data generation unit 207a according to the comparative example. FIG. 10 is a block diagram showing the configuration of the input data generation unit 207 of the second embodiment.

The input data generation unit 207 includes an input buffer 301, a selection circuit 302, and an output buffer 303. Here, the size of the input buffer 301 is 16 bits, and the size of the output buffer 303 is 4 bits. Hereinafter, the case where the bit length K of the multiplication element is changed to 1, 2, or 4 bits will be described.

Data of the multiplication element from the data memory 104 is input to the input buffer 301. The input buffer 301 stores data of each bit digit of the multiplication element. The input buffer 301 stores data in the order corresponding to the data storage format of the data memory. FIGS. 9 and 10 show the storage order of 16-bit data in the data memory 104 when K=1, 2, and 4.

The selection circuit 302 selects data input to the input buffer 301 and outputs the data to the output buffer 303. The selection circuit 302 selects 4-bit data from 16-bit data stored in the input buffer 301. The output buffer 303 stores data selected by the selection circuit 302. The output buffer 303 collectively outputs the stored data to the memory block 102. The data output from the output buffer 303 is supplied to one memory block 102. Then, the memory block 102 performs the multiply-accumulate operation in the same manner as the first embodiment.

In the following description, the data length of the input data is denoted by N, the word length of the data memory 104 is denoted by W, and the data length of the multiplication element is denoted by K. The data length N of the input data corresponds to the size of the output buffer 303, and N=4 in FIGS. 9 and 10. In the data memory 104, writing and reading of data are performed in units of word length W. The word length W of the data memory 104 corresponds to the size of the input buffer 301, and in FIGS. 9 and 10, the word length W=16 (=$2^4$). The data length K of the multiplication element corresponds to the number of bit digits of the multiplication element. The length K of the multiplication element is a power of 2, i.e., an integer represented by $2^n$, where n is an integer greater than or equal to 0.

In the input data generation unit 207 shown in FIG. 9, the input buffer 301 stores the same multiplication element in adjacent bits. Further, the data memory 104 stores data in the order of the multiplication elements in the same manner as the general data storage format. For example, when the multiplication element is 4-bit data (K=4), data $a^0_1$, $a^1_1$, $a^2_1$, and $a^3_1$ of one multiplication element $a_1$ are stored in 4 consecutive bits. Next to the multiplication element $a_1$, data $a^0_2$, $a^1_2$, $a^2_2$, and $a^3_2$ of the following multiplication element $a_2$ are stored in four consecutive bits. Similarly, when the multiplication element is 2-bit data (K=2), the data $a_1$ and all of one multiplication element are stored in two neighboring bits. Next to the multiplication element $a_1$, data $a^0_2$ and $a^1_2$ of the following multiplication element $a_2$ are stored in two consecutive bits. When the multiplication element is 1-bit data (K=1), $a^0_i$ to $a^0_{16}$ of the multiplication elements $a_1$ to $a_{16}$ are stored in this order.

The input buffer 301 of the input data generation unit 207 has 16 bits. The selection circuit 302 selects data from 16-bit data and outputs the data to the output buffer 303. At this time, the selection circuit 302 needs to change the order of the data so that the data of the same bit digit is consecutive. That is, the selection circuit 302 selects data of the same bit digit of four successive multiplication elements. Therefore, when the input data generation unit 207 is made to correspond to different data lengths K, the selection circuit 302 becomes complicated as shown in FIG. 9. Therefore, an increase in area or a decrease in speed may occur.

Therefore, in the present embodiment, the data memories 104 store data in the order shown in FIG. 10. The case where the data length K of the multiplication element is 4 bits is the same as in FIG. 9. That is, in the data memory 104, the data of one multiplication element is stored in succession, and the data is stored in the order of the multiplication elements. The bit digits of the multiplication elements are in ascending order, such as 0, 1, 2, and 3, but may be in descending order.

When the data length K of the multiplication element is 2 bits, data are stored in the data memory 104 in the order of $a^0_1$, $a^1_1$, $a^0_5$, $a^1_5$, $a^0_2$, $a^1_2$, $a^0_6$, $a^1_6$, . . . as shown in FIG. 10. That is, in the data memory 104, the data of one multiplication elements are stored in succession, but the data are stored in an order other than the order of the multiplication elements. For example, next to the multiplication element $a_1$, the data of the multiplication element as which is not the next multiplication element $a_2$ is stored. The bit digits of the multiplication elements are in ascending order, such as 0 and 1, but may be in descending order.

When the data length K of the multiplying element is 1 bits, data is stored in the data memory 104 in the order of $a^0_1$, $a^0_5$, $a^0_9$, $a^0_{13}$, $a^0_2$, $a^0_6$, . . . as shown in FIG. 10. That is, in the data memory 104, data is stored in an order other than the multiplication element order. For example, next to the multiplication element $a_1$, the data of the multiplication element as which is not the next multiplication element $a_2$ is stored.

When the word length W of the data memory 104, the data length K of the multiplication element, and the largest data length K_max of the multiplication element are used, the i-th (integer greater than or equal to 0 and less than W) data $a^k_{index}$ of one word can be generalized by the following equation (1).

[Equation 1]

$$a^k_{index} \qquad (1)$$
$$\text{index} = \left(\frac{(i \bmod \text{K\_max})}{K}\right) \times \frac{W}{\text{K\_max}} + \frac{i}{\text{K\_max}}$$
$$k = i \bmod K$$

Note that Y mod X is a remainder obtained by dividing Y by X, and the values of the quotients in the equation (1) (i.e., i/K_max, W/K_max, and (i mod K_max)/K) are integer values obtained by rounding off the values below the decimal point. Decoders 105 with (n+1) patterns of bit scalability can be implemented if the multiplication element data length K is $2^n$. The data memory 104 stores the multiplication elements so that the storage order of the one-word data $a^k_{index}$ satisfies the equation (1). That is, the control unit 106 writes the data of each bit of the plurality of multiplication elements into the data memory 104 in the writing order satisfying the equation (1). In the equation (1), k is in ascending order, but may be in descending order.

Figure 11:
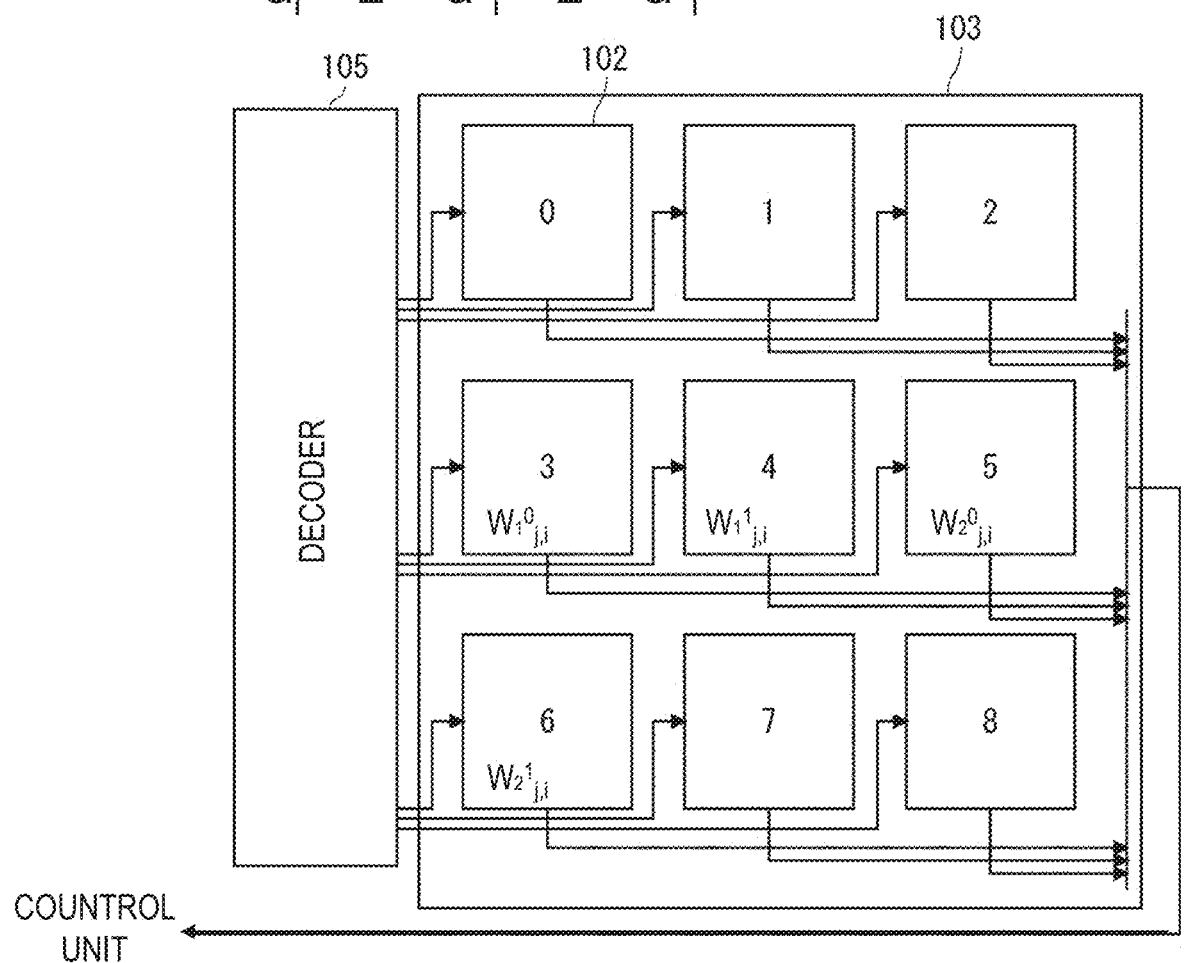
FIG. 11 is a diagram showing an arithmetic operation flow of a memory block when K=2 bits are used.

Hereinafter, the process in the second embodiment will be described. FIG. 11 is a diagram showing the operation flow of the memory block 102. FIG. 12 is a table showing bit digits and block addresses of multiplication elements in each step. In FIGS. 11 and 12, the data length K of the multiplication element is set to 2, and the multiplication element is set to 2-bit data. The multiply-accumulate operation device 100 repeats eight steps (hereinafter, referred to as step 1 to step 8). Let M be the number of multiplication elements included in the word length W. In the example of K=2 bits in FIG. 10, since the multiplying elements of $a_1$ to $a_8$ are stored in the input buffer 301, M=8. Typically, M=W/K.

The four memory blocks 102 having the block addresses 3 to 6 store the data $w_{j,i}$ of the multiplied element. In the memory block 102 of the block address 3, the $w_1{}^0_{j,i}$ of the 0th bit digit of the multiplied element is stored. The data $w_1{}^1_{j,i}$ of the first bit digit of the multiplied element is stored in the memory block 102 of the block address 4. In the memory block 102 of the block address 5, the $w_2{}^0_{j,i}$ of the 0th bit digit of the multiplied element is stored. The data $w_2{}^1_{j,i}$ of the first digit of the multiplied element is stored in the memory block 102 of the block address 6.

The data of the same bit digit of the multiplied elements used for one multiply-accumulate operation is divided into two memory blocks 102 and stored. More specifically, the memory blocks 102 corresponding to the block addresses 3 and 5 store the 0th bit digit data of the multiplied elements used for one multiply-accumulate operation. The memory blocks 102 corresponding to the block addresses 4 and 6 store the first bit digit data of the multiplied elements used for one multiply-accumulate operation. The memory blocks 102 corresponding to the block addresses 3 and 4 store data of different bit digits of a plurality of multiplied elements. The memory blocks 102 corresponding to the block addresses 5 and 6 store data of different bit digits of a plurality of multiplied elements.

In step 1, the decoder 105 collects the data of the 0th bit digit for a plurality of multiplication elements which are 1st to M/2-th multiplication elements to obtain input data. Here, as described above, the input data generation unit 207 selects a part of the data of the input buffer 301 to be input data. Then, the selector 206 supplies the input data to the memory block 102 of the block address 3. The memory block 102 of block address 3 outputs a multiply-accumulate operation result (i.e., a first step operation value) of the input data and the data stored in the memory block 102 to the control unit 106. In the bit shifter 1062, the control unit 106 multiplies the first step operation value by a value $(1=2^c)$ corresponding to the bit digit (c=0) of the multiplication element and a value $(1=2^d)$ corresponding to the bit digit d (d=0) of the multiplied element to obtain a multiplication value. The control unit 106 stores the multiplication value as the accumulated adding value in the accumulation adder 1063.

In step 2, similarly to step 1, the data of the 0th bit digit of the plurality of multiplication elements from 1st to M/2 th digit is input data. The selector 206 supplies the input data to the memory block 102 of the block address 4. The memory block 102 of block address 4 outputs, to the control unit 106, a multiply-accumulate operation result of the input data and the data stored in the memory block 102 of block address 4, which is a second step operation value. In the bit shifter 1062, the control unit 106 multiplies the second step operation value by a value $(1=2^c)$ corresponding to the bit digit (c=0) of the multiplication element and a value $(2=2^d)$ corresponding to the bit digit d (d=1) of the multiplied element to obtain a multiplication value. The control unit 106 updates the accumulated adding value by adding the multiplication value to the accumulated adding value obtained in the previous step in the accumulation adder 1063.

In step 3, the decoder 105 collects data of the first bit digit for a plurality of multiplication elements from 1 to M/2 as input data. The selector 206 supplies the input data to the memory block 102 of the block address 3. The memory block 102 of block address 3 outputs, to the control unit 106, a multiply-accumulate operation result of the input data and the data stored in the memory block 102 of block address 3, which is a third step operation value. In the bit shifter 1062, the control unit 106 multiplies the third step operation value by a value $(2=2^c)$ corresponding to the bit digit (c=1) of the multiplication element and a value $(1=2^d)$ corresponding to the bit digit d (d=0) of the multiplied element to obtain a multiplication value. The control unit 106 updates the accumulated adding value by adding the multiplication value to the accumulated adding value obtained in the previous step in the accumulation adder 1063.

In step 4, as in step 3, the data of the first digit of the plurality of multiplication elements from 1st to M/2 are input data. The selector 206 supplies the input data to the memory block 102 of the block address 4. The memory block 102 of block address 4 outputs, to the control unit 106, a multiply-accumulate operation result of the input data and the data stored in the memory block 102 of block address 4, which is a fourth step operation value. In the bit shifter 1062, the control unit 106 multiplies the fourth-step operation value by a value $(2=2^c)$ corresponding to the bit digit (c=1) of the multiplication element and a value $(2=2^d)$ corresponding to the bit digit d (d=1) of the multiplied element to obtain a multiplication value. The control unit 106 updates the accumulated adding value by adding the multiplication value to the accumulated adding value obtained in the previous step in the accumulation adder 1063.

In step 5, the decoder 105 collects the data of the 0th digit of the plurality of multiplication elements from M/2+1 to M-th multiplication element, and sets the data as input data. The selector 206 supplies the input data to the memory block 102 of the block address 5. The memory block 102 of block address 5 outputs a multiply-accumulate operation result (i.e., a fifth step operation value) of the input data and the data stored in the memory block 102 of block address 5 to the control unit 106. In the bit shifter 1062, the control unit 106 multiplies the fifth step operation value by a value $(1=2^c)$ corresponding to the bit digit (c=0) of the multiplication element and a value $(1=2^d)$ corresponding to the bit digit d (d=0) of the multiplied element to obtain a multiplication value. The control unit 106 updates the accumulated adding value by adding the multiplication value to the accumulated adding value obtained in the previous step in the accumulation adder 1063.

In step 6, as in step 5, the data of the 0th bit digit of the plurality of multiplication elements from (M/2+1) to M-th is the input data. The selector 206 supplies the input data to the memory block 102 of the block address 6. The memory block 102 of block address 6 outputs a multiply-accumulate operation result (i.e., the sixth step operation value) of the input data and the data stored in the memory block 102 of block address 6 to the control unit 106. In the bit shifter 1062, the control unit 106 multiplies the sixth step operation value by a value $(1=2^c)$ corresponding to the bit digit (c=0) of the multiplication element and a value $(2=2^d)$ corresponding to the bit digit d (d=1) of the multiplied element to obtain a multiplication value. The control unit 106 updates the accumulated adding value by adding the multiplication value to the accumulated adding value obtained in the previous step in the accumulation adder 1063.

In step 7, the decoder 105 collects the data of the first digit of the M/2+1 to M-th multiplication elements as input data. The selector 206 supplies the input data to the memory block 102 of the block address 5. The memory block 102 of block address 5 outputs a multiply-accumulate operation result of the input data and the data stored in the memory block 102, which is a seventh step operation value, to the control unit 106. In the bit shifter 1062, the control unit 106 multiplies the seventh step operation value by a value $(2=2^c)$ corresponding to the bit digit (c=1) of the multiplication element and a value $(1=2^d)$ corresponding to the bit digit d (d=0) of the multiplied element to obtain a multiplication value. The control unit 106 updates the accumulated adding value by adding the multiplication value to the accumulated adding value obtained in the previous step in the accumulation adder 1063.

In step 8, similarly to step 7, the data of the first digit of the plurality of multiplication elements from M/2+1 to M-th is input data. The selector 206 supplies the input data to the memory block 102 of the block address 6. The memory block 102 of block address 6 outputs a multiply-accumulate operation result of the input data and the data stored in the memory block 102, which is an eighth step operation value, to the control unit 106. In the bit shifter 1062, the control unit 106 multiplies the eighth step-operation value by a value $(2=2^c)$ corresponding to the bit digit (c=1) of the multiplication element and a value $(2=2^d)$ corresponding to the bit digit d (d=1) of the multiplied element to obtain a multiplication value. The control unit 106 updates the accumulated adding value by adding the multiplication value to the accumulated adding value obtained in the previous step in the accumulation adder 1063. After the processing up to step 8 is completed, the control unit 106 converts the accumulated adding result into the data of the largest bit digit of the multiplication element in the write data generation unit 1064, and stores the data in the data memory 104.

Figure 13:
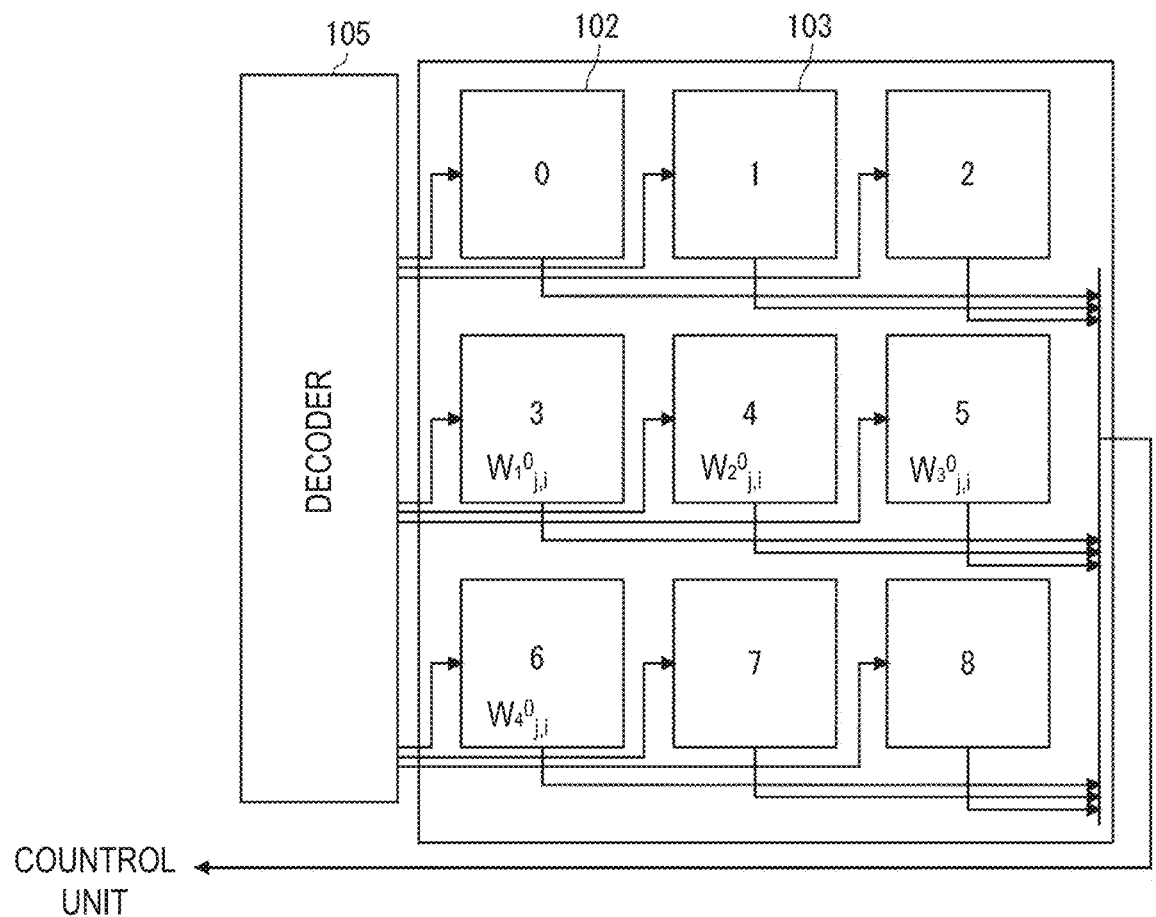
FIG. 13 is a diagram showing an arithmetic operation flow of a memory block in the case of K=1 bit.

Next, a case where the data length K of the multiplication element is 1 will be described with reference to FIGS. 13 and 14. FIG. 13 is a diagram showing the operation flow of the memory block. FIG. 14 is a table showing bit digits and block addresses of multiplication elements in each step. In FIGS. 13 and 14, the data length K of the multiplication element is set to 1, and the multiplied element is set to 1-bit data. The multiply-accumulate operation device 100 repeats four steps (hereinafter, referred to as step 1 to step 4). In the following description, M is the number of multiplication elements included in the word length W. In the case of K=1 bits in FIG. 10, since the multiplication elements of $a_1$ to $a_{16}$ are stored in the input buffer 301, M=16.

The four memory blocks 102 corresponding to the block addresses 3 to 6 store the data $w_{j,i}$ of the multiplied elements. In the memory block 102 of the block address 3, the $w_{1\ j,i}^{0}$ of the zeroth digit of the multiplied element is stored. In the memory block 102 of the block address 4, the data $w_{2\ j,i}^{0}$ of the 0th bit digit of the multiplied element is stored. In the memory block 102 of the block address 5, the $w_{3\ j,i}^{0}$ of the 0th digit of the multiplied element is stored. The data $w_{4\ j,i}^{1}$ of the 0th digit of the multiplied element is stored in the memory block 102 of the block address 6.

The data of the same bit digit of the multiplied elements used for one multiply-accumulate operation is divided into four memory blocks 102 and stored. More specifically, the memory blocks 102 corresponding to the block addresses 3 to 6 all store the 0th bit data of the multiplied element used for one multiply-accumulate operation.

In step 1, the decoder 105 collects the data of the 0th bit digit for a plurality of multiplication elements from 1 to M/4-th multiplication element to obtain input data. Here, as described above, the input data generation unit 207 selects a part of the data of the input buffer 301 to be input data. Then, the selector 206 supplies the input data to the memory block 102 of the block address 3. The memory block 102 of block address 3 outputs a multiply-accumulate operation result (i.e., a first step operation value) of the input data and the data stored in the memory block 102 of block address 3 to the control unit 106. In the bit shifter 1062, the control unit 106 multiplies the first step operation value by a value ($1=2^c$) corresponding to the bit digit (c=0) of the multiplication element and a value ($1=2^d$) corresponding to the bit digit d (d=0) of the multiplied element to obtain a multiplication value. The control unit 106 stores the multiplication value as the accumulated adding value in the accumulation adder 1063.

In step 2, the decoder 105 collects the data of the 0th bit digit of the plurality of multiplication elements from M/4+1 to M/2-th multiplication element as input data. The selector 206 supplies the input data to the memory block 102 of the block address 4. The memory block 102 of block address 4 outputs, to the control unit 106, a multiply-accumulate operation result of the input data and the data stored in the memory block 102 of block address 4, which is a second step operation value. In the bit shifter 1062, the control unit 106 multiplies the second step operation value by a value ($1=2^c$) corresponding to the bit digit (c=0) of the multiplication element and a value ($1=2^d$) corresponding to the bit digit d (d=0) of the multiplied element to obtain a multiplication value. The control unit 106 updates the accumulated adding value by adding the multiplication value to the accumulated adding value obtained in the previous step in the accumulation adder 1063.

In step 3, the decoder 105 collects the data of the 0th bit digit of the plurality of multiplication elements from (M/2+1) to (3M/4)-th as input data. The selector 206 supplies the input data to the memory block 102 of the block address 5. The memory block 102 of block address 5 outputs, to the control unit 106, a multiply-accumulate operation result of the input data and the data stored in the memory block 102 of block address 5, which is a third step operation value. In the bit shifter 1062, the control unit 106 multiplies the third step operation value by a value ($1=2^c$) corresponding to the bit digit (c=0) of the multiplication element and a value ($1=2^d$) corresponding to the bit digit d (d=0) of the multiplied element to obtain a multiplication value. The control unit 106 updates the accumulated adding value by adding the multiplication value to the accumulated adding value obtained in the previous step in the accumulation adder 1063.

In step 4, the decoder 105 collects the data of the 0th bit digit of the plurality of multiplication elements from the 3M/4+1 to the M-th, and sets the data as input data. The selector 206 supplies the input data to the memory block 102 of the block address 6. The memory block 102 of block address 6 outputs, to the control unit 106, a multiply-accumulate operation result of the input data and the data stored in the memory block 102 of block address 6, which is a fourth step operation value. In the bit shifter 1062, the control unit 106 multiplies the fourth-step operation value by a value ($1=2^c$) corresponding to the bit digit (c=0) of the multiplication element and a value ($1=2^d$) corresponding to the bit digit d (d=0) of the multiplied element to obtain a multiplication value. The control unit 106 updates the accumulated adding value by adding the multiplication value to the accumulated adding value obtained in the previous step in the accumulation adder 1063. After the processing up to step 4 is completed, the control unit 106 converts the accumulated adding result into the data of the largest bit digit of the multiplication element in the write data generation unit 1064, and stores the data in the data memory 104.

In present embodiment, when k (k is any integer from 0 to K, and K is an integer from 2) is used as the bit digit number of the multiplication element, the data $a^k$ index stored in the i-th of the one word of the data memory 104 (i is an integer from 0 to less than W) is stored so as to satisfy the above equation (1).

This makes it possible to realize bit scalability while suppressing the scale and speed delay of a circuit for generating input data to a memory block. The selection circuit 302 of the input data generation unit 207 can easily select appropriate data. For example, when K=1, 2, and 4 as scalability, in FIG. 10, the selection circuit 302 may select one bit from the four bits of the input buffer 301. On the other hand, in the configuration of FIG. 9, the number of bits of the input buffer 301 selected by the selection circuit 302 is large. Therefore, the configuration of the present embodiment can suppress the size and speed delay of the circuits.

Third Embodiment

Generally, in a multiply-accumulate operation technique using a memory cell array, there is a possibility that an error may occur in the operation result due to the effect of variation in device characteristics. Such errors may cause performance degradation in the application. As a method for dealing with random variations of elements different from one chip to another, a method of performing machine learning again using input/output results of actual devices is used.

In the case of performing machine learning, it is necessary to repeat the following processes (a) to (c) several hundred times by using several tens of thousands of pieces of data depending on the application. (a) Calculation is performed using the provisional parameters. (b) Calculate the error from the expected value. (c) Adjust the parameters Therefore, the larger the scale of the neural network, the longer learning time is required. In addition, the cost of re-learning each chip is very large.

Figure 15:
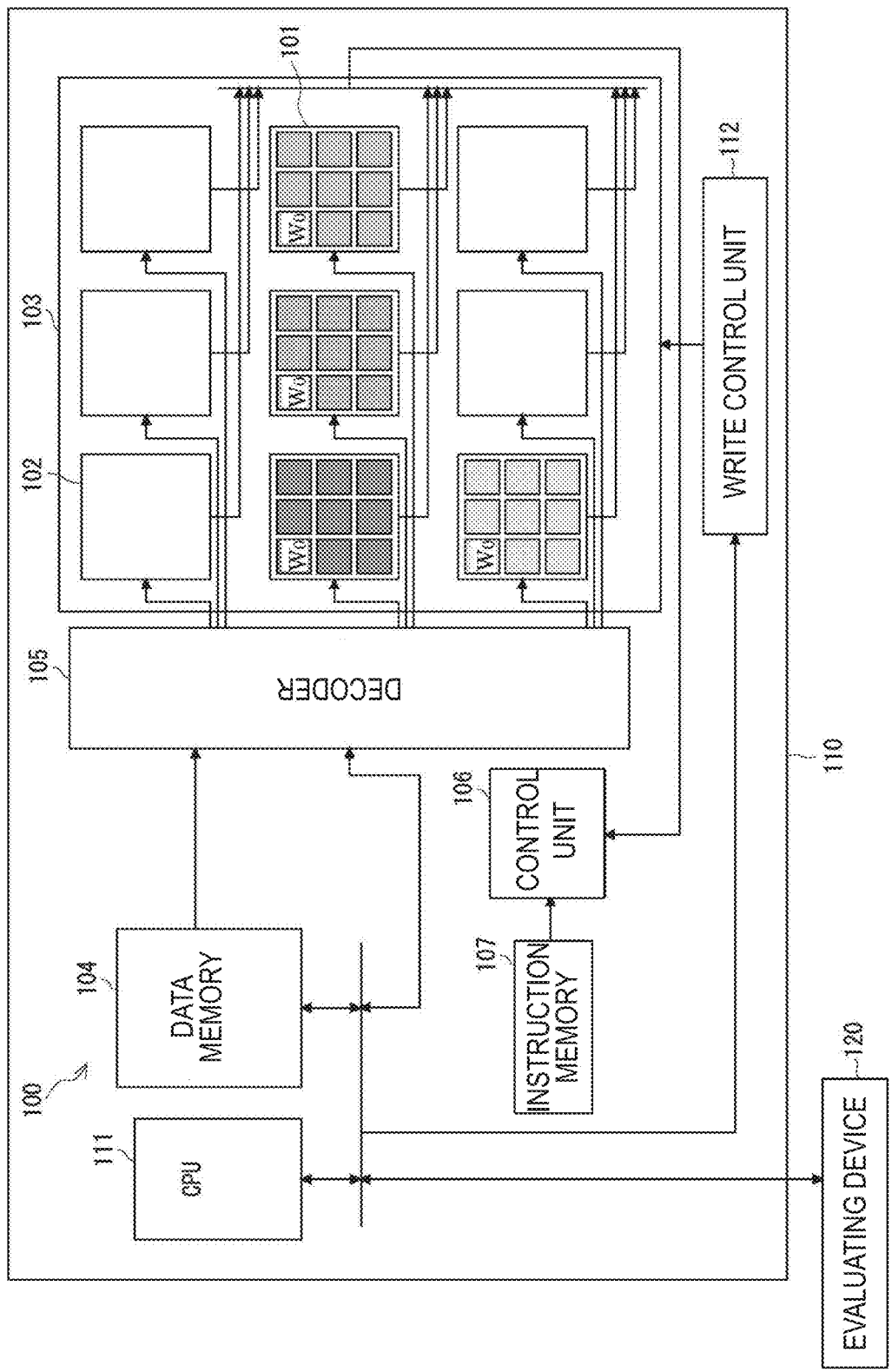
FIG. 15 is a block diagram showing a system for third embodiment.

In the third embodiment, a technique of preventing a decrease in recognition accuracy due to variation without performing re-learning is shown. FIG. 15 is a system configuration diagram of a multiply-accumulate operation device 100 according to the third embodiment. In the multiply-accumulate operation device 100 shown in FIG. 15, a CPU 111, a write control unit 112, a chip 110, and an evaluating device 120 are added to the configuration shown in FIG. 1. Specifically, the chip 110 includes the multiply-accumulate operation device 100 of the first embodiment and a write control unit 112. The evaluating device 120 is connected to the chips 110. The evaluating device 120 evaluates the operation result of the multiply-accumulate operation device 100.

In a multiply-accumulate operation technique using a memory element array, a parameter obtained in advance by machine learning is written in a memory area as multiplied elements. In the present embodiment, the write control unit 112 changes only the address of the write destination of the multiplied element. That is, the write control unit 112 shifts the address of the write destination. The multiply-accumulate operation device 100 performs a multiply-accumulate operation for each of the addresses. Then, the evaluation device 120 evaluates the recognition accuracy for each of the shifted addresses by using the multiply-accumulate operation result.

The evaluating device 120 may be, for example, a processing device such as a personal computer provided separately from the chip 110. Alternatively, a CPU 111 mounted on the chip 110 may perform some or all of the evaluations. For example, when the multiply-accumulate operation device 100 performs the multiply-accumulate operation of the neural network for image recognition, the offset address is changed so that the accuracy of the recognized image is the highest.

Figure 16:
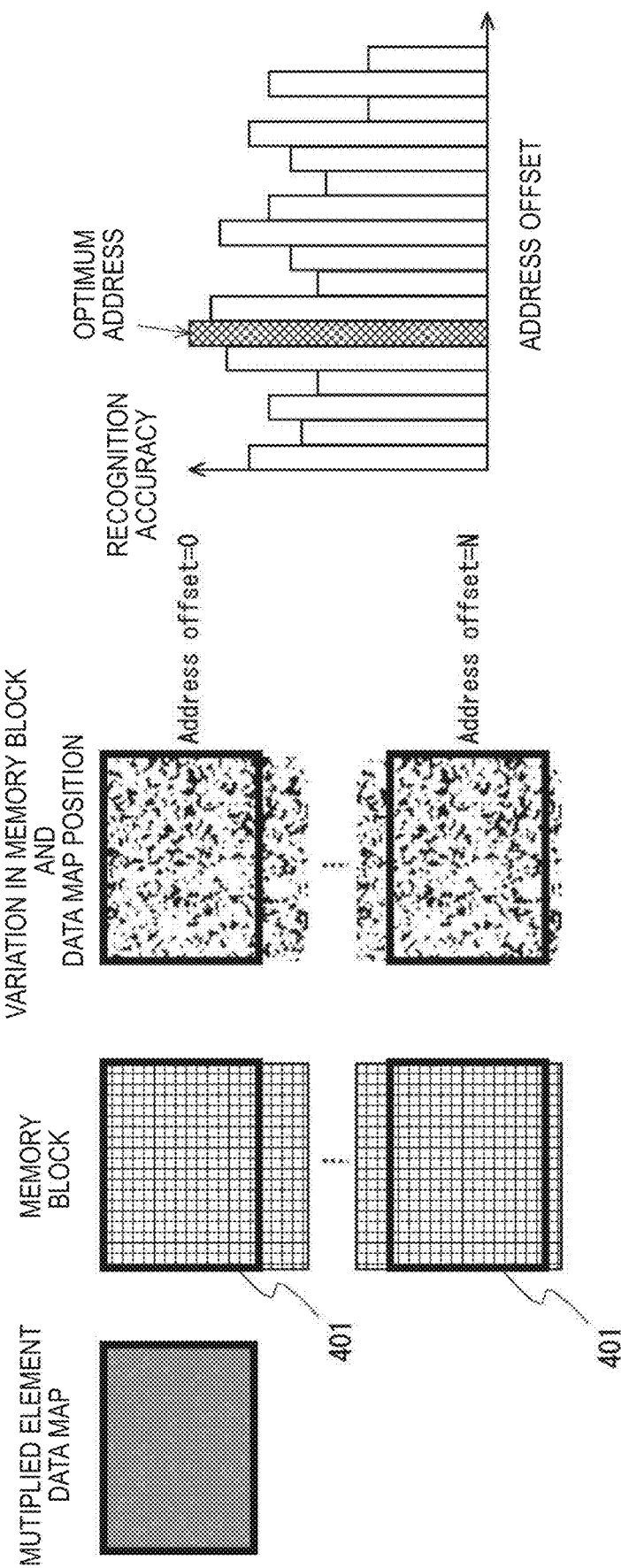
FIG. 16 is a diagram for explaining the process of shifting an address to obtain an optimal address.

FIG. 16 shows an address shift of write data and an evaluation image thereof. The multiplied element is a 0/1 combination. In addition, when data of 1 is stored in a memory element having a large characteristic variation, an error with respect to a operation result of the multiplied element becomes large. On the other hand, a method of distributing parameters for neural networks around 0 is widely used, and many data tend to be 0. Therefore, the address to which the multiplied element is written is shifted in units of rows or blocks. For example, in FIG. 16, the write address 401 is shifted by one row. By doing so, 0 is written to an element having a large characteristic variation which has a fatal adverse effect on the calculation accuracy. That is, by shifting the write address 401, a difference occurs in the result of the multiply-accumulate operation, and therefore, a difference occurs in the recognition accuracy. For example, the evaluating device 120 obtains an offset address so that a memory element having large characteristic variation is written 0. This offset address is an optimum address with the highest recognition accuracy.

Figure 17:
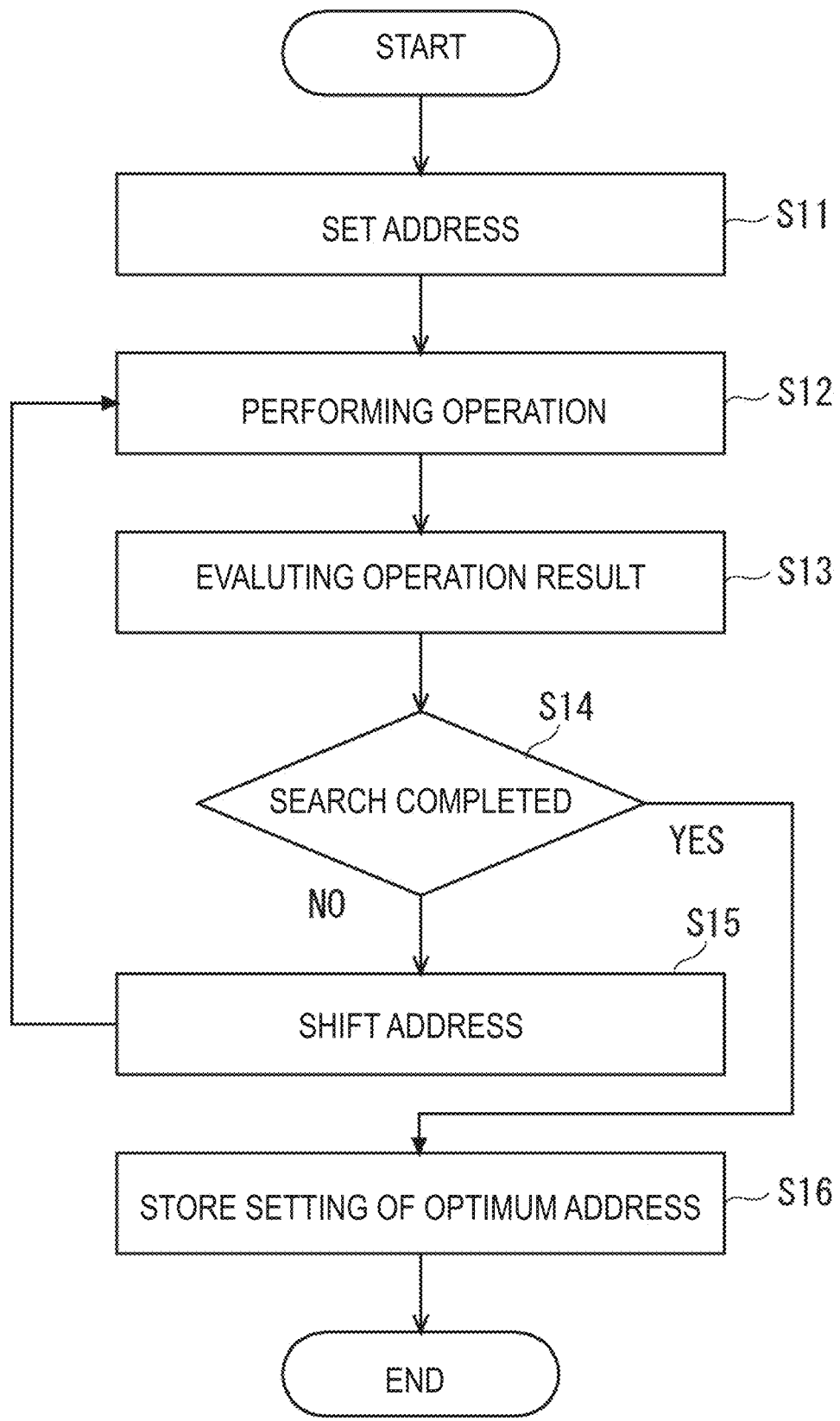
FIG. 17 is a flow chart illustrating a process for determining the optimal address.

FIG. 17 shows a flow of calculation accuracy adjustment. First, in step S11, the write control unit 112 sets an address. Here, an address whose offset is 0 is specified as an initial value. In step S12, the multiply-accumulate operation device 100 performs an operation. Here, the multiply-accumulate operation indicated by first embodiment is performed. Then, the multiply-accumulate operation device 100 performs a repetitive multiply-accumulate operation, and outputs the final operation result to the evaluating device 120.

Next, in step S13, the evaluating device 120 evaluates the operation result. That is, the evaluating device 120 evaluates the recognition accuracy based on the operation result of the multiply-accumulate operation. For example, when the multiply-accumulate operation device 100 performs a multiply-accumulate operation for an image recognizing neural network, a plurality of image samples are prepared. Then, the multiply-accumulate operation device 100 stores data based on one picture sample in the data memory. In S12, the multiply-accumulate operation device 100 performs a multiply-accumulate operation on the respective picture samples. One offset address is used to perform a multiply-accumulate operation on each of the images. The evaluating device 120 evaluates whether or not each image is correctly recognized. Then, the evaluating device 120 evaluates the recognition results of the respective images, and stores a numerical value indicating the recognition accuracy.

Next, in step S14, the write control unit 112 determines whether or not the address shift search is completed. When the search is not completed (NO in S14), the write control unit 112 shifts the address (S15). Then, the processes of S12 and S13 are executed with the shifted addresses. As a result, the evaluating device 120 can evaluate the recognition accuracy at the shifted addresses. The address to be shifted may be a block address or a row address of the block address. Alternatively, the write control unit 112 may shift both the block address and the row address in order.

When the search is completed (YES in S14), the evaluating device 120 stores the setting of the optimum addresses (S16). That is, the write control unit 112 shifts the addresses in order, and the evaluating device 120 evaluates the recognition accuracy of all the shift addresses. Then, the evaluating device 120 records, as the offset address, the address having the highest recognition accuracy among all the shift addresses. In this manner, the preliminary test is completed.

Figure 18:
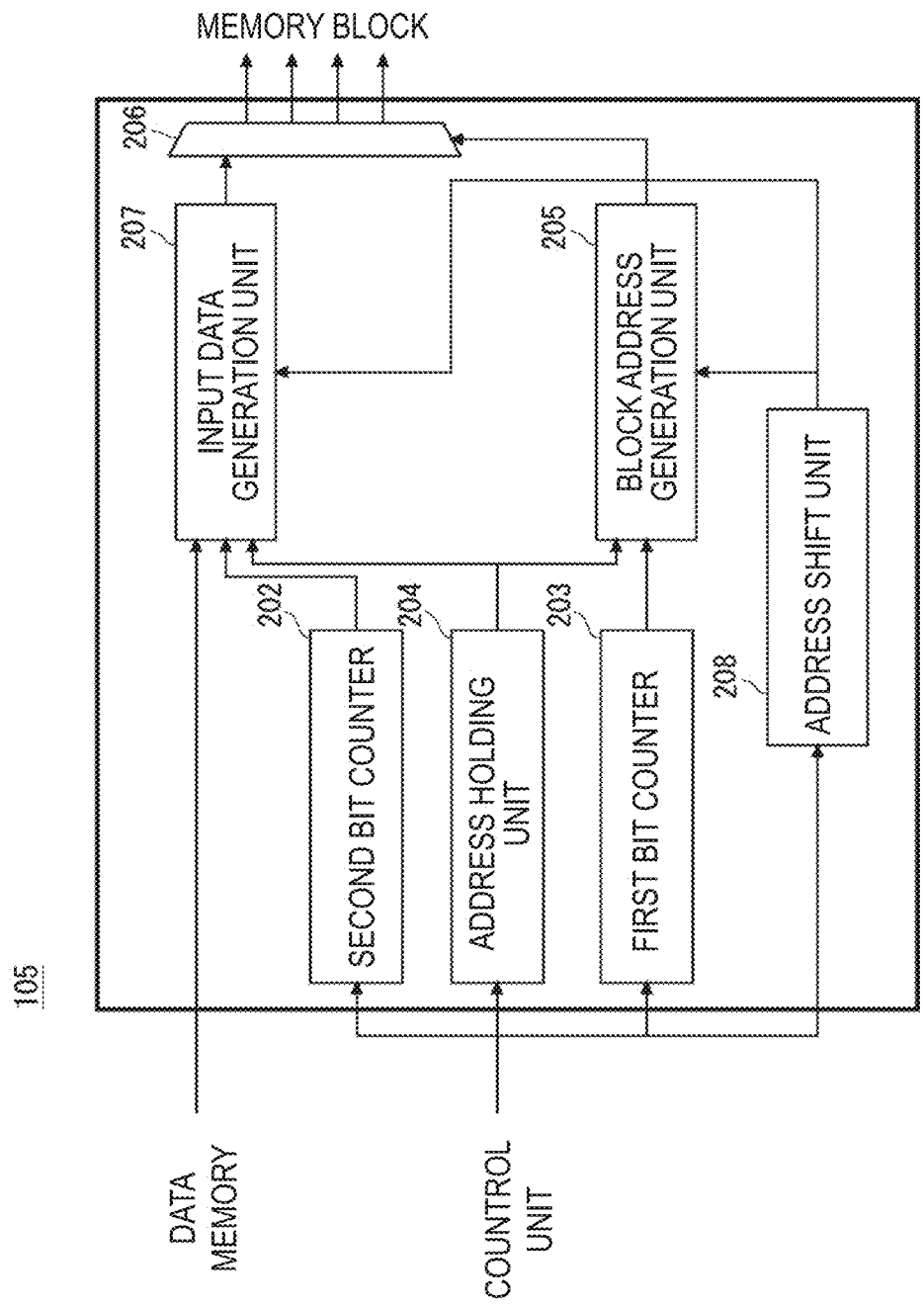
FIG. 18 is a block diagram illustrating a decoder in the third embodiment.

FIG. 18 is a block diagram showing a configuration of the decoder 105 according to the present embodiment. In the decoder 105, an address shift unit 220 is added to the configuration of FIG. 3. The address shift unit 220 has a function of shifting a write address. The evaluating device 120 outputs the optimum offset address information obtained by the preliminary tests to the multiply-accumulate operation device 100.

For example, the address shift unit 208 receives the information of the optimum offset address obtained in the preliminary test from the control unit 106. Then, the address shift unit 208 shifts the write destination of the multiplication element according to the offset address information. By doing so, it is possible to suppress the influence of the characteristic variation of the memory element while using the parameter that has been learned once. In the present embodiment, it is possible to suppress the deterioration of the recognition accuracy without re-learning. Therefore, it is possible to shorten the development time for implementing the inference program by the DNN for each memory device.

The multiply-accumulate operation device 100 according to first to third embodiment is suitable for the multiply-accumulate operation for the DNN processing at the end point in the automated operation, the surveillance cameras, and the like. Power efficiencies are enhanced by the device and methods of the multiply-accumulate operation according to the present embodiment. Further, by using the multiply-accumulate operation device 100, it is possible to efficiently operate the entire application such as image recognition. In particular, the multiply-accumulate calculation device 100 is suitable for applications such as automated control of robots, surveillance cameras, drones, and the like.

Part or all of the above-described multiply-accumulate operation device 100 can be realized by hardware including semiconductor circuits such as semiconductor memory. Furthermore, some functions of the multiply-accumulate operation device 100 may be realized by software programs.

Figure 19:
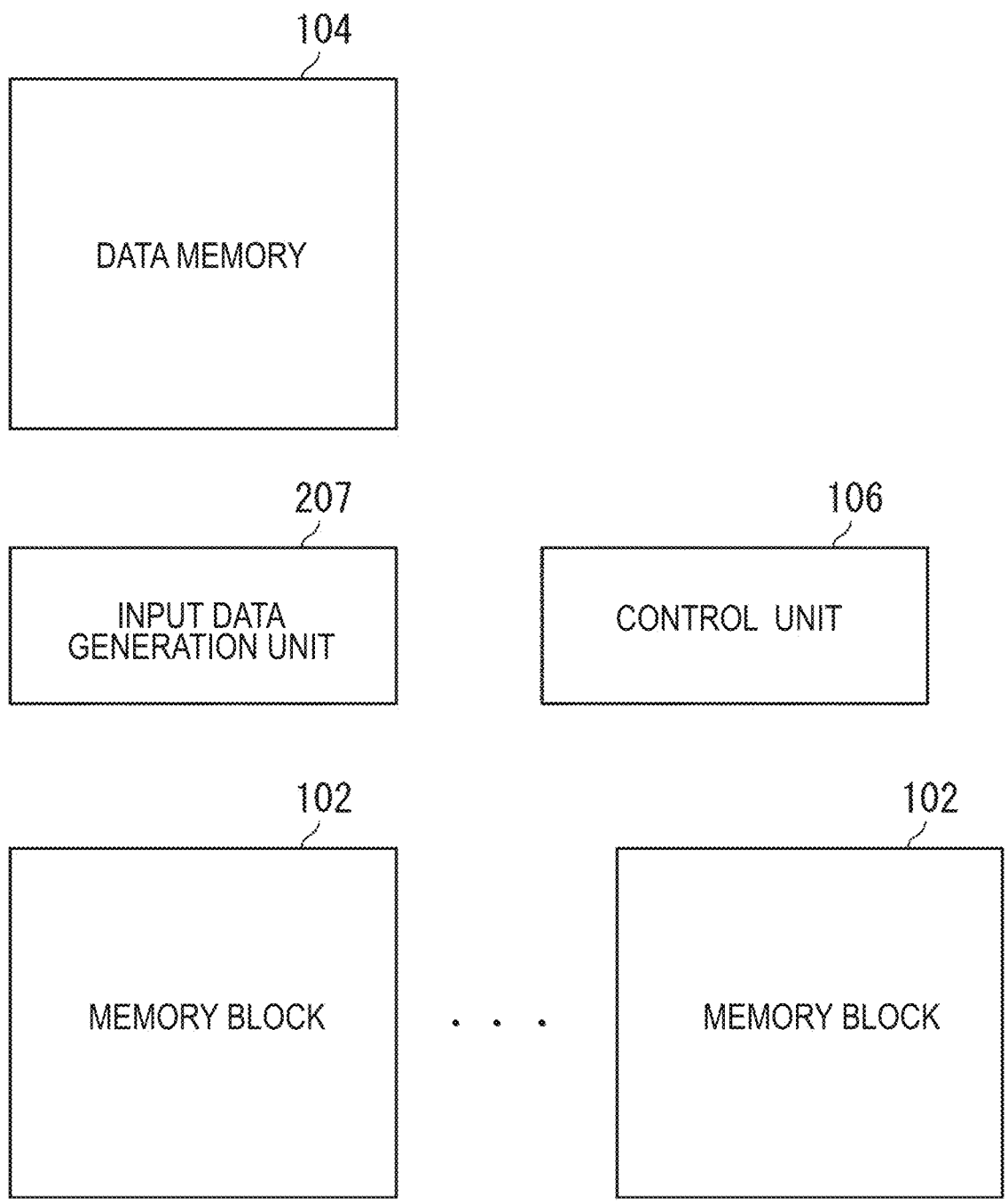
FIG. 19 is a block diagram showing a multiply-accumulate operation device according to another embodiment.

FIG. 19 is a block diagram showing a configuration of a multiply-accumulate operation device 100 according to another embodiment. The multiply-accumulate calculation device 100 includes a plurality of memory blocks 102, an input data generation unit 207, a control unit 106, and a data memory 104. The plurality of memory blocks 102 store a plurality of multiplied elements and perform a multiply-accumulate operation on the input data. One memory block 102 stores the first bit value of the same bit digit of the plurality of multiplied elements as a one-bit value. The input data generation unit 207 generates the input data by extracting the second bit value of the same bit digit from a plurality of multiplication elements. The data memory 104 accumulatively adds a value corresponding to the multiply-accumulate operation of the memory block 102. The data memory 104 stores the accumulated adding value obtained by the accumulative addition as the multiplication element of the next multiply-accumulate operation. As a result, the multiply-accumulate operation can be performed efficiently.

The multiply-accumulate operation method includes the following steps (A) to (G). (A) Reading a plurality of multiplication elements from a data memory. (B) Selecting one memory block from a plurality of memory blocks that store the first bit value of the same bit digit of a plurality of multiplied elements as a one-bit value. (C) Generating input data by extracting a second bit value of the same bit digit from the plurality of multiplication elements. (D) Input the input data into the selected one of the memory blocks. (E) The memory block performs a multiply-accumulate operation using the first bit value and the second bit value. (F) Accumulatively adding a value corresponding to the multiply-accumulate operation of the memory block. (G) The accumulated adding value obtained by the cumulative addition is stored in the data memory as the multiplication element of the next multiply-accumulate operation. As a result, the multiply-accumulate operation can be performed efficiently.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The program may also be supplied to the computer by various types of transitory computer-readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiment, the present invention is not limited to the embodiment already described, and it is needless to say that various modifications can be made without departing from the gist thereof.

What is claimed is:

1. A multiply-accumulate operation device, comprising:
a plurality of memory blocks storing a plurality of multiplied elements, each of the memory blocks having a multiply-accumulate operation function and storing a plurality of one-bit data which are data of a same bit digit of the multiplied elements as a first bit data and outputting a multiply-accumulate result for input data to be supplied through word lines, the data stored in the memory blocks corresponding to a different bit digit of the multiplied elements;
an input data generation unit generating the input data having second bit data, the second bit data including data of a same bit digit of a plurality of multiplication elements;
a control unit accumulatively adding the multiply-accumulate results from the memory blocks;
a data memory storing an accumulated adding result obtained by the control unit as next multiplication elements;
a first holding unit holding first digit information corresponding to a number of digits of the first bit data in the multiplied elements; and
a second holding unit holding a second digit information corresponding to number of digits of the second bit data in the multiplication elements,
wherein the control unit generates a multiplication value by multiplying the multiply-accumulate result by a value corresponding to the first digit information and a value corresponding to the second digit information, and accumulatively adds the multiplication value.

2. The multiply-accumulate operation device according to claim 1,
wherein the input data generation unit comprises:
an input buffer storing data with a word length W (W being integer of 1 or more) from the data memory;
a selector selecting data with a data length N (N being an integer of 1 to W) from stored data with the word length W in the input buffer; and
an output buffer outputting selected data with the data length N by the selector to the memory blocks, and
wherein assuming that a maximum data length of the multiplication element is K_max, a number of digits of the multiplication element is k (k being any integer of 2 to K and K being a power of 2), data $a^k$index being I-th data in one word of the data memory is stored in order based on the following equation (1) (where i/K_max, W/K_max, and (i mod K_max)/K are an integer value omitted below a decimal point):

$$a_{index}^k \quad (1)$$

$$index = \left(\frac{(i \bmod K\_max)}{K}\right) \times \frac{W}{K\_max} + \frac{i}{K\_max}.$$

$$k = i \bmod K$$

3. The multiply-accumulate operation device according to claim 1, further comprising an address shift unit that shifts a write address for the multiplication elements based on an offset address.

4. A multiply-accumulate operation system comprising:
the multiply-accumulate operation device according to claim 3; and
an evaluation device configured to evaluate the multiply-accumulate results from the multiply-accumulate operation device while changing the write address for the multiplication elements,
wherein the offset address is set based on an evaluation result.

5. A multiply-accumulate operation method, the method comprising:
reading a plurality of multiplication elements from a data memory;
selecting one of a plurality of memory blocks which stores a plurality of one-bit data which are data of the same bit digit of a plurality of multiplied elements as first bit value;
generating an input data by extracting bit data of the same bit digit from each of the multiplication elements as a second bit value;
inputting the input data to the selected one of the memory blocks;
performing multiply-accumulate operation in the memory blocks using the first bit value and the second bit value;
accumulatively adding the multiply-accumulate operation result;
storing an accumulated adding result data to the data memory as next multiplication element;
storing first digit information corresponding to number of digits of the first bit value in the multiplied elements;
storing second digit information corresponding to number of digits of the second bit value in the multiplication elements,
generating multiplication data by multiplying the multiply-accumulate result by a value corresponding to the first digit information and a value corresponding to the second digit information; and
accumulatively adding the multiplication data.

6. The method according to claim 5,
wherein the generating the input data comprises:
reading data with a word length W (W being integer of 1 or more) from the data memory;
selecting data with a data length N (N being an integer of 1 to W) from the data with the word length W; and
outputting selected data with the data length N to the memory blocks, and
wherein data $a^k_{index}$ being I-th data in one word of the data memory is stored in order based on the following equation (1) (where i/K_max, W/K_max, and (i mod K_max)/K are an integer value omitted below a decimal point):

$$a_{index}^k \quad (1)$$

-continued $$index = \left(\frac{(i \bmod K\_max)}{K}\right) \times \frac{W}{K\_max} + \frac{i}{K\_max}.$$

$$k = i \bmod K$$

7. The method according to claim 5, further comprising:
shifting a write address for the multiplication elements based on an offset address.

8. The method according to claim 7, further comprising:
evaluating the multiply-accumulate results while changing the write address for the multiplication elements,
wherein the offset address is set based on evaluation results.

9. A multiply-accumulate operation device, comprising:
a plurality of memory blocks storing a plurality of multiplied elements, each of the memory blocks having a multiply-accumulate operation function and storing a plurality of one-bit data which are data of a same bit digit of the multiplied elements as first bit data and outputting a multiply-accumulate result for input data to be supplied through word lines, the data stored in the memory blocks corresponding to a different bit digit of the multiplied elements;
an input data generation unit generating the input data having second bit data, the second bit data including data of a same bit digit of a plurality of multiplication elements;
a control unit accumulatively adding the multiply-accumulate results from the memory blocks;
a data memory storing an accumulated adding result obtained by the control unit as next multiplication elements; and
an address shift unit that shifts a write address for the multiplication elements based on an offset address.

10. The multiply-accumulate operation device according to claim 9, further comprising:
a first holding unit holding first digit information corresponding to a number of digits of the first bit data in the multiplied elements; and
a second holding unit holding a second digit information corresponding to number of digits of the second bit in the multiplication elements,
wherein the control unit generates a multiplication value by multiplying the multiply-accumulate result by a value corresponding to the first digit information and a value corresponding to the second digit information, and accumulatively adds the multiplication value.

11. The multiply-accumulate operation device according to claim 9,
wherein the input data generation unit comprises:
an input buffer storing data with a word length W (W being integer of 1 or more) from the data memory;
a selector selecting data with a data length N (N being an integer of 1 to W) from stored data with the word length W in the input buffer; and
an output buffer outputting selected data with the data length N by the selector to the memory blocks, and
wherein assuming that a maximum data length of the multiplication element is K_max, a number of digits of the multiplication element is k (k being any integer of 2 to K and K being a power of 2), data $a^k_{index}$ being I-th data in one word of the data memory is stored in order based on the following equation (1) (where i/K_max, W/K_max, and (i mod K_max)/K are an integer value omitted below a decimal point):

$$a_{index}^{k} \quad (1)$$

$$\text{index} = \left(\frac{(i \bmod K\_max)}{K}\right) \times \frac{W}{K\_max} + \frac{i}{K\_max}.$$

$$k = i \bmod K$$

12. A multiply-accumulate operation system comprising:

the multiply-accumulate operation device according to claim 9; and an evaluation device configured to evaluate the multiply-accumulate results from the multiply-accumulate operation device while changing the write address for the multiplication elements, wherein the offset address is set based on an evaluation result.

\* \* \* \* \*